US008064633B2

(12) United States Patent
Noda et al.

(10) Patent No.: US 8,064,633 B2
(45) Date of Patent: Nov. 22, 2011

(54) INFORMATION PROCESSING APPARATUS, IMAGE DISPLAY APPARATUS, CONTROL METHODS THEREFOR, AND PROGRAMS FOR CAUSING COMPUTER TO PERFORM THE METHODS

(75) Inventors: Takuro Noda, Tokyo (JP); QiHong Wang, Tokyo (JP); Akiko Terayama, Tokyo (JP); Tomohiko Gotoh, Kanagawa (JP); Tamaki Kojima, Kanagawa (JP); Takuo Ikeda, Tokyo (JP); Hidenori Karasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 951 days.

(21) Appl. No.: 12/032,053

(22) Filed: Feb. 15, 2008

(65) Prior Publication Data

US 2008/0232695 A1   Sep. 25, 2008

(30) Foreign Application Priority Data

Feb. 22, 2007   (JP) ................................. 2007-042203

(51) Int. Cl.
  *G06K 9/00*  (2006.01)
  *H04N 5/66*  (2006.01)
(52) U.S. Cl. ........................................ 382/100; 348/383
(58) Field of Classification Search .................. 382/100, 382/115–118, 224, 227, 305; 348/154, 155, 348/169–172, 267, 383; 379/93.03, 207.13
  See application file for complete search history.

(56) References Cited

U.S. PATENT DOCUMENTS 7,110,983 B2 * 9/2006 Shear et al. ..................... 705/55

FOREIGN PATENT DOCUMENTS

| JP | 2001-273302 | 10/2001 |
| JP | 2003-208465 | 7/2003 |
| JP | 2003-344078 | 12/2003 |
| JP | 2004-69438 | 3/2004 |
| JP | 2004-152315 | 5/2004 |
| JP | 2005-110111 | 4/2005 |
| JP | 2005-190087 | 7/2005 |
| JP | 2006-146755 | 6/2006 |
| JP | 2006-350225 | 12/2006 |
| JP | 2007-11637 | 1/2007 |

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

An information processing apparatus includes a content storage unit storing a plurality of pieces of content; a background-image storage unit storing a background image corresponding to the plurality of pieces of content stored in the content storage unit; an attribute-information storage unit storing attribute information for each of the plurality of pieces of content in association with the plurality of pieces of content, the attribute information including a corresponding position in the background image; a classification unit classifying the plurality of pieces of content into one or more clusters on the basis of the attribute information; and a rendering unit rendering images indicating the classified pieces of content in a predetermined order on a cluster-by-cluster basis and rendering an area of the background image, the area including the corresponding position included in the attribute information of content corresponding to at least one of the images rendered.

19 Claims, 26 Drawing Sheets

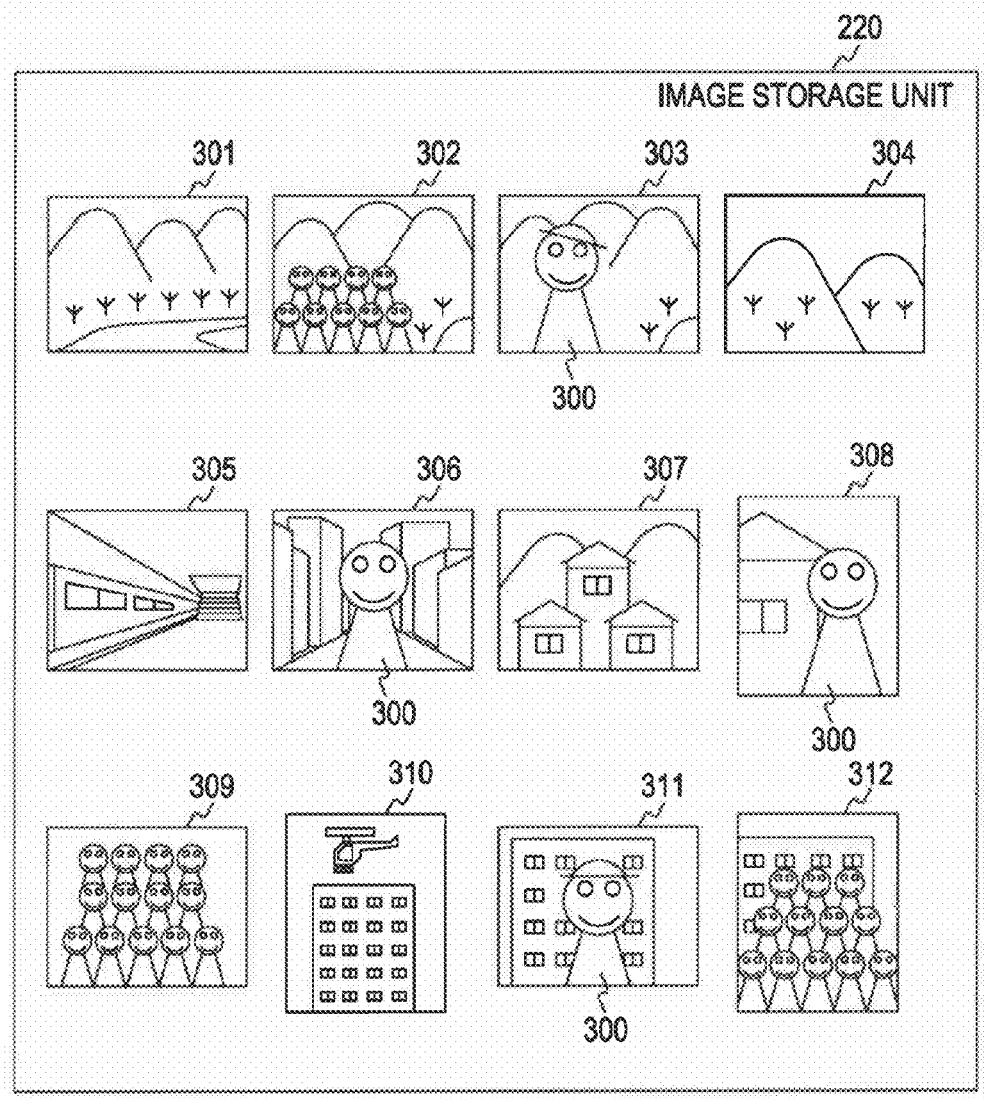

FIG. 4A

| | 301 | 302 | 303 | 304 | 305 | 306 | 307 | 308 | 309 | 310 | 311 | 312 |
|---|---|---|---|---|---|---|---|---|---|---|---|---|
| IMAGE-CAPTURING DATE | 1/27 10:00 | 1/27 13:00 | 1/27 13:10 | 1/27 14:30 | 2/10 8:00 | 2/10 12:00 | 2/10 15:00 | 2/11 10:00 | 2/10 14:00 | 2/20 10:30 | 2/20 11:00 | 2/20 11:10 |
| IMAGE-CAPTURING PLACE | | | | | | | | | | | | |
| THUMBNAIL | | | | | | | | | | | | |
| ORIGINAL-IMAGE PATH | 001 | 002 | 003 | 004 | 005 | 006 | 007 | 008 | 009 | 010 | 011 | 012 |
| EVENT | BBQ | BBQ | BBQ | BBQ | KYOTO TRIP | KYOTO TRIP | KYOTO TRIP | KYOTO TRIP | KYOTO TRIP | FIRE DRILL | FIRE DRILL | FIRE DRILL |
| COLOR | LANDSCAPE | | ONE | LANDSCAPE | LANDSCAPE | ONE | LANDSCAPE | ONE | MANY | LANDSCAPE | ONE | |
| NUMBER OF PERSONS | | MANY | | | | | | | | | | MANY |

| | 301 | 302 | 303 | 304 | 305 | 306 | 307 | 308 | 309 | 310 | 311 | 312 |
|---|---|---|---|---|---|---|---|---|---|---|---|---|
| FEATURE AMOUNT | | | | | | | | | | | | |

242

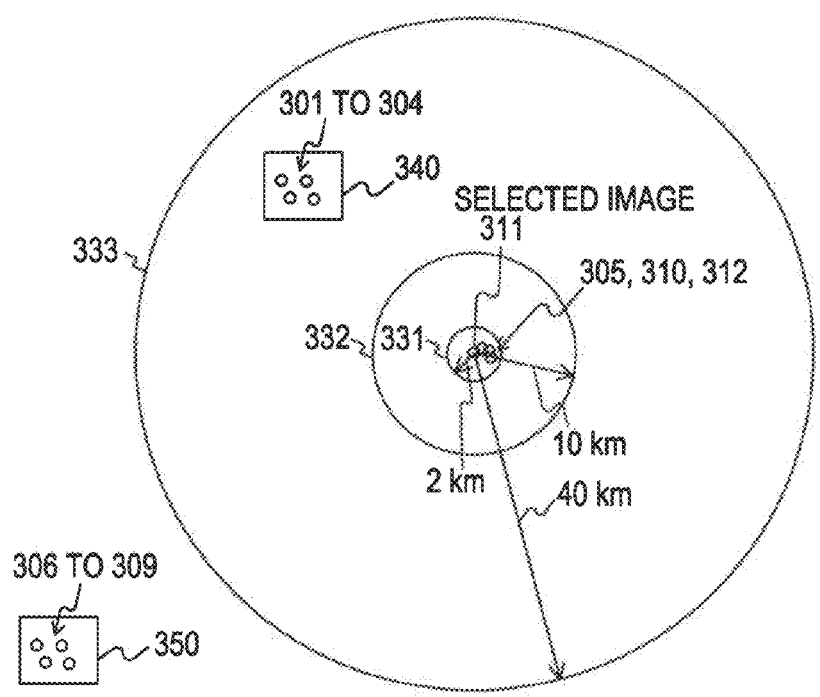

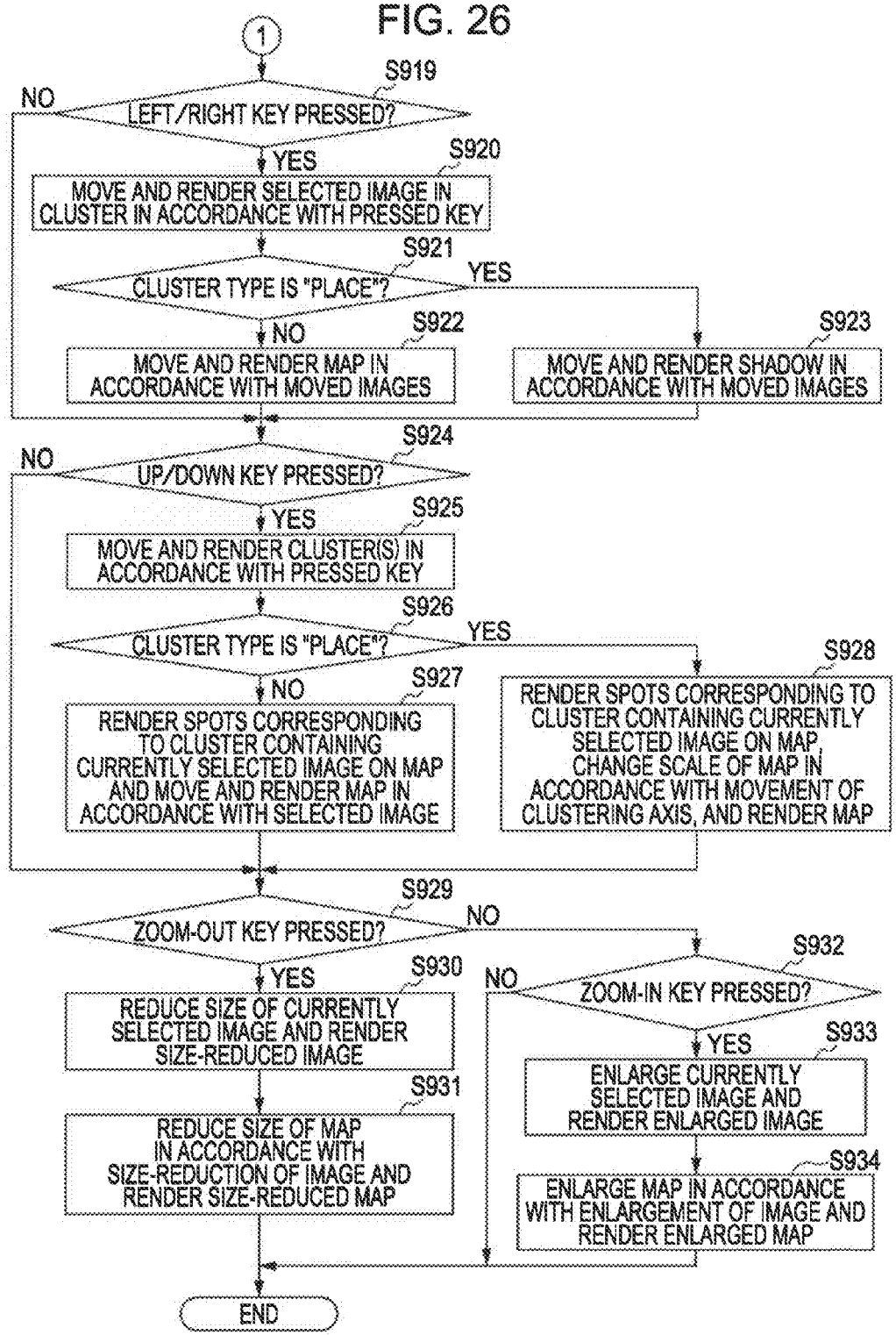

INFORMATION PROCESSING APPARATUS, IMAGE DISPLAY APPARATUS, CONTROL METHODS THEREFOR, AND PROGRAMS FOR CAUSING COMPUTER TO PERFORM THE METHODS

CROSS REFERENCES TO RELATED APPLICATIONS

The present invention contains subject matter related to Japanese Patent Application JP 2007-042203 filed in the Japanese Patent Office on Feb. 22, 2007, the entire contents of which are incorporated herein by reference.

BACKGROUND OF THE INVENTION

1. Field of the Invention

The present invention relates to information processing apparatuses, and more particularly, to an information processing apparatus that arranges and renders images at predetermined positions on a map, an image display apparatus, control methods therefor, and programs for causing a computer to perform the methods.

2. Description of the Related Art

To capture an image of an object, such as a landscape or a person, image capturing apparatuses, such as digital cameras, that can record an image of the object and position information regarding a place where the image is captured are available in the related art. To display the image captured using the image capturing apparatuses, information processing apparatuses, such as personal computers, that can superimpose and display the image at a position on a map corresponding to the place where the image was captured on the basis of the position information recorded in association with the image are available in the related art.

For example, an image reproducing apparatus capable of mapping and displaying thumbnail images generated on the basis of captured images on a map on the basis of position data for each of the captured images and selecting a desired thumbnail image from among the thumbnail images displayed on the map has been proposed (for example, see Japanese Unexamined Patent Application Publication No. 2005-110111, FIG. 1).

SUMMARY OF THE INVENTION

According to the foregoing techniques in the related art, thumbnail images of captured images are displayed at positions on a map corresponding to places where the images were captured. By moving the map on a screen, images captured in predetermined areas can be viewed using the displayed map as a clue. By zooming in or out the displayed map, images captured within a specific area can be viewed on the screen.

According to the foregoing techniques in the related art, in order to view captured images, a plurality of images can be organized into a group on the basis of places where the images were captured within a specific area, whereby the images can be viewed at a glance on the screen. Alternatively, instead of organizing images into a group on the basis of the image-capturing places within a specific area, if images can be organized into a group in accordance with a user's preference and viewed at a glance on the screen, it is expected that the captured images can become more enjoyable. For example, captured images of the user alone may be organized into a group and viewed at a glance on the screen, or captured images of landscapes may be organized into a group and viewed at a glance on the screen. In this case, besides the images, if positions on the map corresponding to the images are indicated to the user, it is expected that the user can further enjoy the images.

It is desirable to render a group of related pieces of content together with a background image corresponding to these pieces of content.

According to a first embodiment of the present invention, there is provided an information processing apparatus including the following elements: content storage means for storing a plurality of pieces of content; background-image storage means for storing a background image corresponding to the plurality of pieces of content stored in the content storage means; attribute-information storage means for storing attribute information for each of the plurality of pieces of content stored in the content storage means in association with the plurality of pieces of content, the attribute information for each of the plurality of pieces of content including a corresponding position in the background image; classification means for classifying the plurality of pieces of content into one or more clusters on the basis of the attribute information stored in the attribute-information storage means; and rendering means for rendering images indicating the classified pieces of content in a predetermined order on a cluster-by-cluster basis and rendering an area of the background image, the area including the corresponding position included in the attribute information of content corresponding to at least one of the images rendered. There is also provided a control method for the foregoing information processing apparatus and a program for causing a computer to perform the method. Accordingly, a plurality of piece of content are classified into one or more clusters on the basis of attribute information for each of the pieces of content. Images indicating the classified pieces of content are rendered in a predetermined order on a cluster-by-cluster basis. An area of a background image including a position corresponding to at least one of the images rendered is rendered.

According to a second embodiment of the present invention, there is provided an information processing apparatus including the following elements: image storage means for storing a plurality of images; map-information storage means for storing map information; attribute-information storage means for storing attribute information for each of the plurality of images stored in the image storage means in association with the plurality of images; image classification means for classifying the plurality of images stored in the image storage means into one or more clusters on the basis of the attribute information stored in the attribute-information storage means; and rendering means for rendering the classified images in a predetermined order on a cluster-by-cluster basis and rendering an area of the map, the area corresponding to at least one of the images rendered. There is also provided a control method for the foregoing information processing apparatus and a program for causing a computer to perform the method. Accordingly, a plurality of images are classified into one or more clusters on the basis of attribute information for each of the images. The classified images are rendered in a predetermined order on a cluster-by-cluster basis. An area of a map corresponding to at least one of the images rendered is rendered.

According to the second embodiment of the present invention, the attribute information may include a position on the map, the position corresponding to the map information stored in the map-information storage means. The information processing apparatus may further include operation accepting means for accepting an operation entered for selecting at least one of the images rendered by the rendering means; and control means for controlling, in a case where the operation entered for selecting the image is accepted by the operation accepting means, the rendering means to place and render the image in an area of the map, the area including a position included in the attribute information corresponding to the image. Accordingly, when an operation entered for selecting an image is accepted, the image is placed and rendered in an area of the map including a position corresponding to the selected image.

According to the second embodiment of the present invention, the rendering means may render a position marker indicating a position on the map, the position being included in the attribute information corresponding to each of images in a cluster containing the selected image. Accordingly, a position marker indicating a position on the map corresponding to each of images in a cluster containing the selected image is rendered. In this case, the rendering means may connect the selected image and the position marker corresponding to the selected image with a predetermined image. Accordingly, the selected image and the position marker corresponding to the selected image can be connected with a predetermined image. In this case, the attribute information may include times and dates at which the plurality of images stored in the image storage means were captured. The rendering means may render predetermined line segments so as to connect position markers corresponding to the images in the cluster containing the selected image in order of time and date included in the attribute information corresponding to the images. Accordingly, predetermined line segments are rendered so as to connect position markers in order of time and date corresponding to the images in the cluster containing the selected image.

According to the second embodiment of the present invention, the attribute information may include a feature amount for each of the plurality of images stored in the image storage means. The image classification means may classify the plurality of images stored in the image storage means into two clusters on the basis of a result of comparison of the feature amount included in the attribute information corresponding to the selected image and feature amounts included in the attribute information corresponding to images other than the selected image. The rendering means may place and render the selected image at a position differing from positions at which the classified images are placed on a cluster-by-cluster basis. Accordingly, the plurality of images are classified into two clusters on the basis of a result of comparison of the feature amount corresponding to the selected image and feature amounts corresponding to images other than the selected image. The selected image is placed and rendered at a position differing from positions at which the classified images are placed on a cluster-by-cluster basis.

According to the second embodiment of the present invention, the image classification means may classify the plurality of images stored in the image storage means into one or more clusters on the basis of a result of comparison of the position included in the attribute information corresponding to the selected image and positions included in the attribute information corresponding to images other than the selected image. The rendering means may render a circle in accordance with the clusters around the position included in the attribute information corresponding to the selected image. Accordingly, the plurality of images are classified into one or more clusters on the basis of a result of comparison of the position corresponding to the selected image and positions corresponding to images other than the selected image. A circle is rendered in accordance with the clusters around the position corresponding to the selected image. In this case, the operation accepting means may accept an operation entered for moving a cluster containing the selected image. In a case where the operation entered for moving the cluster is accepted by the operation accepting means, the control means may control the rendering means to move images in the cluster containing the selected image, change a scale of the map in accordance with movement of the images, and render the images and the map. Accordingly, when an operation entered for moving a cluster containing the selected image is accepted, images in the cluster containing the selected image are moved, and a scale of the map is changed in accordance with movement of the images.

According to the second embodiment of the present invention, the operation accepting means may accept an operation entered for selecting a type of clusters. In a case where the operation entered for selecting the type of clusters is accepted by the operation accepting means, the control means may control the image classification means to classify the plurality of images stored in the image storage means by the selected type of clusters on the basis of the selected image serving as a reference image. Accordingly, the plurality of images are classified by the selected type of clusters on the basis of the selected image serving as a reference image.

According to the second embodiment of the present invention, the rendering means may arrange and render the classified images around the selected image serving as a center position on a cluster-by-cluster basis. Accordingly, the classified images are arranged and rendered around the selected image serving as a center position on a cluster-by-cluster basis.

According to the second embodiment of the present invention, the information processing apparatus may further include operation accepting means for accepting an operation entered for moving the images rendered by the rendering means; and control means for controlling, in a case where the operation entered for moving the images is accepted by the operation accepting means, the rendering means to move and render the images rendered by the rendering means and to move and render the map in accordance with movement of the images. Accordingly, when an operation entered for moving the images is accepted, the images are moved, and the map is moved in accordance with movement of the images.

According to the second embodiment of the present invention, the information processing apparatus may further include display means for displaying the images and the area of the map rendered by the rendering means. Accordingly, the images and the area of the map rendered are displayed.

According to a third embodiment of the present invention, there is provided an image display apparatus including the following elements: image storage means for storing a plurality of images; map-information storage means for storing map information; attribute-information storage means for storing attribute information for each of the plurality of images stored in the image storage means in association with the plurality of images; image classification means for classifying the plurality of images stored in the image storage means into one or more clusters on the basis of the attribute information stored in the attribute-information storage means; rendering means for rendering the classified images in a predetermined order on a cluster-by-cluster basis and rendering an area of the map, the area corresponding to at least one of the images rendered; and display means for displaying the images and the area of the map rendered by the rendering means. There is also provided a control method for the foregoing image display apparatus and a program for causing a computer to perform the method. Accordingly, a plurality of images are classified into one or more clusters on the basis of attribute information for each of the images. The classified images are rendered in a predetermined order on a cluster-by-cluster basis. An area of a map corresponding to at least one of the images rendered is rendered.

According to the embodiments of the present invention, a group of related pieces of content can be rendered together with a background image corresponding to these pieces of content.

BRIEF DESCRIPTION OF THE DRAWINGS

FIG. 3 schematically illustrates images stored in an image storage unit 220;

FIG. 4A schematically illustrates a metadata database (DB) 241 storing various types of information corresponding to the images stored in the image storage unit 220;

FIG. 4B schematically illustrates a feature amount DB 242;

FIG. 8 schematically illustrates a classification method of classifying images 301 to 312 by "image-capturing place";

FIG. 26 is a flowchart showing the process of rendering images and a map using the information processing apparatus 200.

DESCRIPTION OF THE PREFERRED EMBODIMENTS

Embodiments of the present invention will now herein be described in detail below with reference to the drawings.

Figure 1:
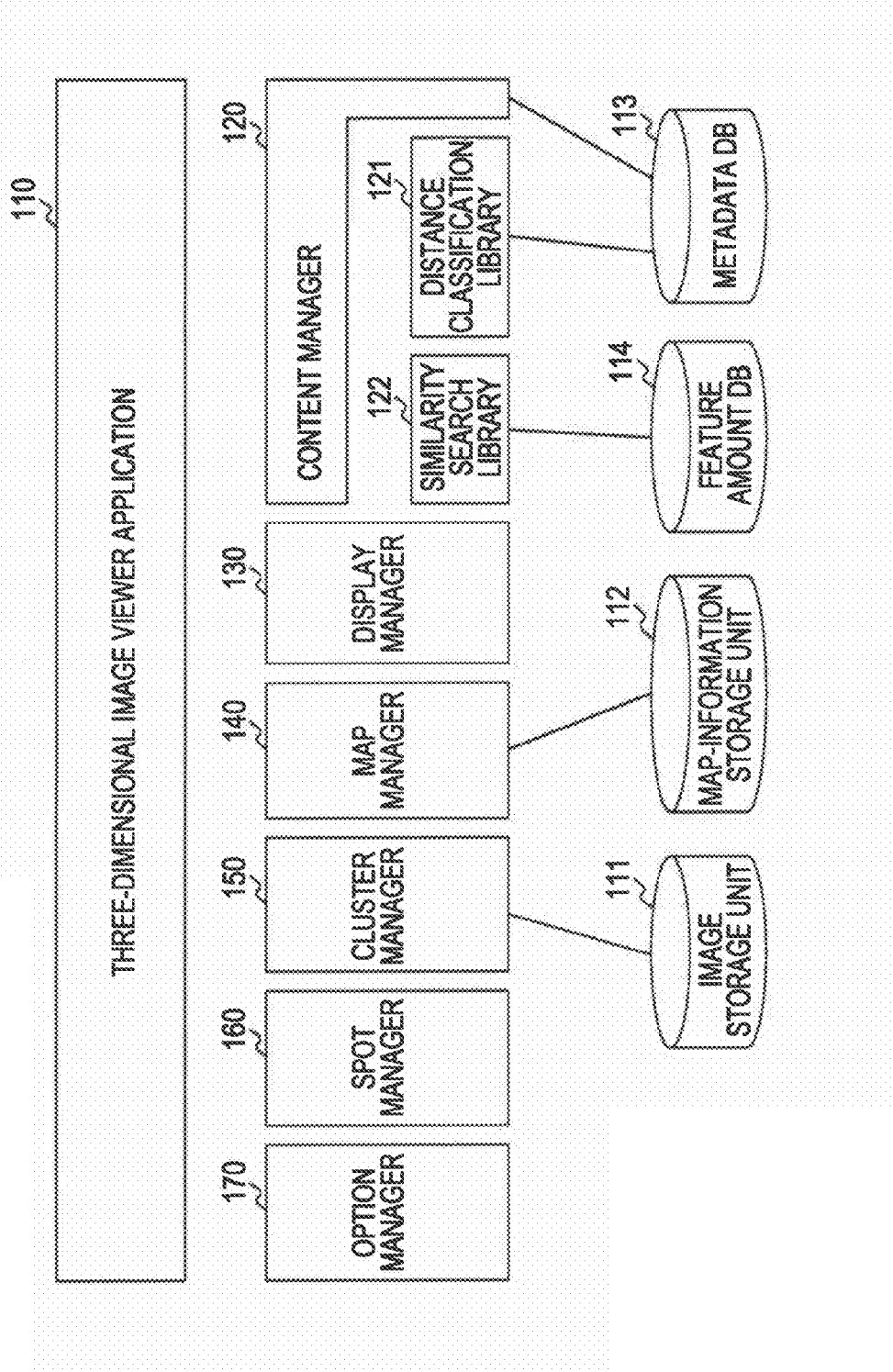
FIG. 1 is a diagram showing an exemplary software configuration of an image display system according to an embodiment of the present invention.

FIG. 1 is a diagram showing an exemplary software configuration of an image display system according to an embodiment of the present invention. The image display system includes a three-dimensional image viewer application 110, an image storage unit 111, a map-information storage unit 112, a metadata DB 113, a feature amount DB 114, a content manager 120, a distance classification library 121, a similarity search library 122, a display manager 130, a map manager 140, a cluster manager 150, a spot manager 160, and an option manager 170.

The three-dimensional image viewer application 110 accepts an operation entered by a user and manages and controls the overall state of the application.

On the basis of information stored in the metadata DB 113 or the feature amount DB 114, the content manager 120 classifies a plurality of images stored in the image storage unit 111 into one or more clusters and provides the clusters into which the images are classified, metadata of the images included in the clusters, and the like to the application. That is, if the type of clusters is "place" or "similarity", the content manager 120 provides clusters into which the images are classified by the distance classification library 121 or the similarity search library 122, metadata of the images included in the clusters, and the like to the application. If the type of clusters is "event", "color", or "number of persons", the content manager 120 issues a query to the metadata DB 113 to obtain metadata corresponding to the images, classifies the images into one or more clusters on the basis of the obtained metadata, and provides the clusters into which the images are classified, metadata of the images included in the clusters, and the like to the application.

On the basis of metadata stored in the metadata DB 113, the distance classification library 121 calculates a relative distance between an image selected from among images stored in the image storage unit 111 and each of the images other than the selected image and classifies the images stored in the image storage unit 111 into one or more clusters in accordance with the calculated relative distances. This classification will be described in detail using FIGS. 7A to 7C and 8.

On the basis of feature amounts stored in the feature amount DB 114, the similarity search library 122 calculates the degree of similarity between an image selected from among images stored in the image storage unit 111 and each of the images other than the selected image and classifies the images stored in the image storage unit 111 into two clusters "similar" and "dissimilar" in accordance with the calculated results.

The display manager 130 controls the positions where images and a map are rendered, which are represented three-dimensionally.

The map manager 140 manages map information stored in the map-information storage unit 112 and renders a map corresponding to the map information.

On the basis of cluster information received from the content manager 120 and images stored in the image storage unit 111, the cluster manager 150 renders the images on a display screen.

The spot manager 160 manages and renders spots indicating places where images were captured, which are arranged on a map.

The option manager 170 manages and renders an option menu used to classify a plurality of images stored in the image storage unit 111 into one or more clusters. For example, to change a clustering axis indicating the type of clusters, the option menu including five items "event", "color", "number of persons", "place", and "similarity" are rendered. These menu items will be described in more detail with reference to FIGS. 10 to 14.

The metadata DB 113 is a database that stores, for each of the plurality of images stored in the image storage unit 111, various types of information including the image-capturing date, image-capturing place, thumbnail image, file path, event, color, and number of persons in association with the plurality of images.

The feature amount DB 114 is a database that stores a feature amount extracted from each of the images stored in the image storage unit 111 in association with the images. The feature amount of each image may be extracted within the image display system. Alternatively, for example, the feature amount of each image extracted in another device may be stored. The metadata DB 113 and the feature amount DB 114 will be described in more detail with reference to FIGS. 4A and 4B.

Figure 2:
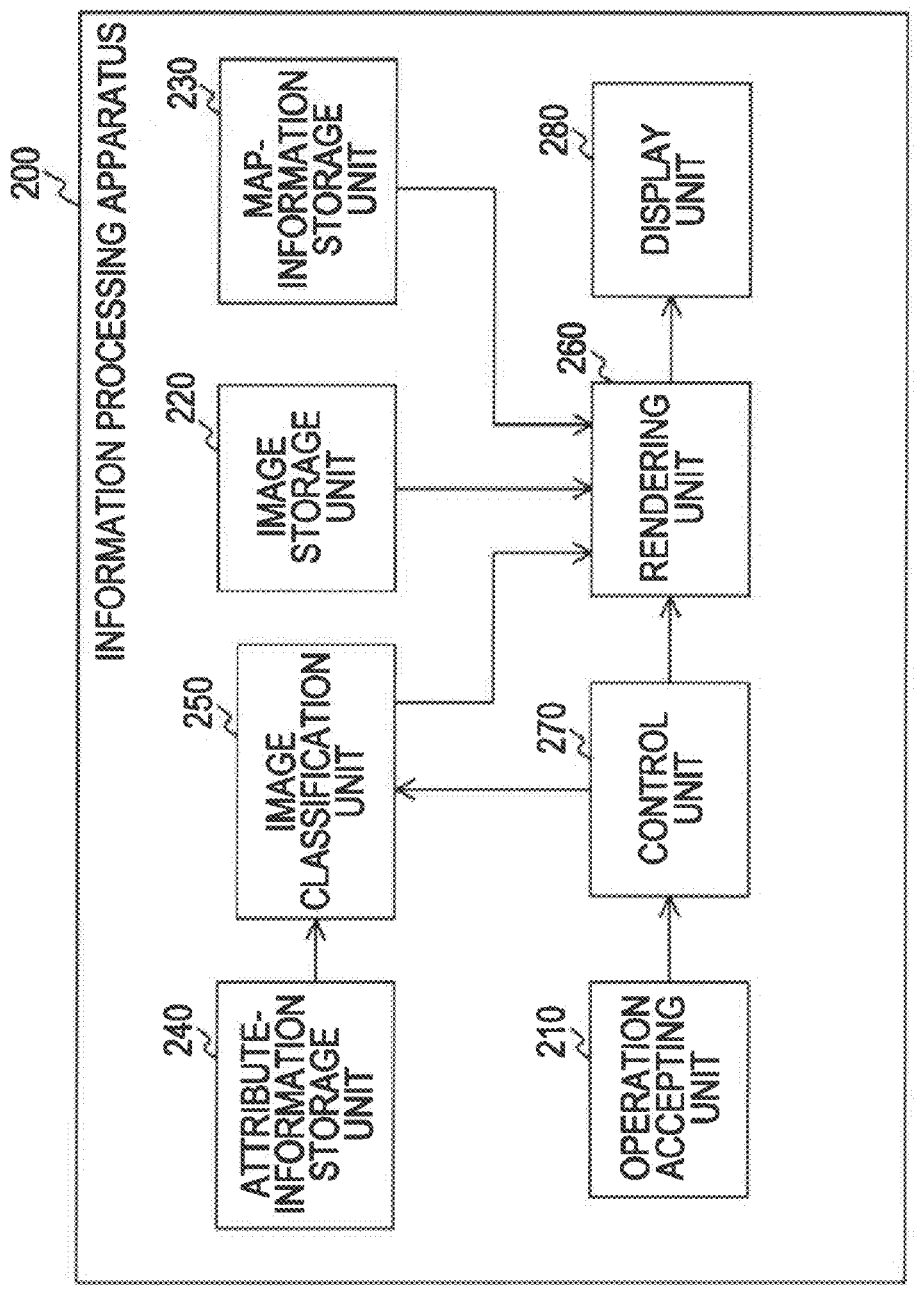
FIG. 2 is a block diagram showing an exemplary functional structure of an information processing apparatus 200 according to the embodiment of the present invention.

FIG. 2 is a block diagram showing an exemplary functional structure of an information processing apparatus 200 according to the embodiment of the present invention. The information processing apparatus 200 includes an operation accepting unit 210, an image storage unit 220, a map-information storage unit 230, an attribute-information storage unit 240, an image classification unit 250, a rendering unit 260, a control unit 270, and a display unit 280.

The operation accepting unit 210 includes a keyboard including various keys and a mouse (pointing device). When the operation accepting unit 210 accepts an operation entered using the keyboard or the like, the operation accepting unit 210 outputs the details of the accepted operation to the control unit 270. Alternatively, at least part of the operation accepting unit 210 and the display unit 280 may be integrally configured as a touch panel.

In the embodiment of the present invention, the case where external operation members are used to enter an operation to the operation accepting unit 210 will be described. The external operation members used in the embodiment include, for example, up, down, right, and left keys, an enter key, a zoom-in key, a zoom-out key, and a menu key. Alternatively, these keys may be allocated to other keys, or the same key can be commonly used as different keys. Without using the dedicated external operation members, these keys may be associated with predetermined keys of the keyboard.

The image storage unit 220 stores a plurality of images and outputs the images stored to the rendering unit 260. The image storage unit 220 stores, for example, images captured using an image capturing apparatus, such as a digital camera. The image storage unit 220 corresponds to the image storage unit 111.

The map-information storage unit 230 stores map information and outputs the map information stored to the rendering unit 260. The map-information storage unit 230 stores, for example, map information corresponding to maps shown in FIGS. 9 to 24. On each of the maps, the names of places and the like are written. The map-information storage unit 230 corresponds to the map-information storage unit 112.

The attribute-information storage unit 240 stores attribute information for each of the plurality of images stored in the image storage unit 220 in association with the plurality of images. The attribute-information storage unit 240 outputs the attribute information to the image classification unit 250. The attribute-information storage unit 240 corresponds to the metadata DB 113 and the feature amount DB 114. These elements will be described in detail with reference to FIGS. 4A and 4B.

On the basis of the attribute information stored in the attribute-information storage unit 240, the image classification unit 250 classifies the plurality of images stored in the image storage unit 220 into one or more clusters and outputs the classified result to the rendering unit 260. The classification method will be described in detail with reference to FIGS. 5A to 8.

The rendering unit 260 renders the images classified by the image classification unit 250 in a predetermined order on a cluster-by-cluster basis and renders an area of the map corresponding to a selected image. Under control of the control unit 270, the rendering unit 260 moves the images rendered and renders an area of the map corresponding to each of the images. Furthermore, under control of the control unit 270, the rendering unit 260 renders menu items and the like. The rendering unit 260 renders each of the images stored in the image storage unit 220 in an image layer and renders a map corresponding to the map information stored in the map-information storage unit 230 in a map layer. Each of the images rendered in the image layer is superimposed on the map rendered in the map layer and displayed. The map and images rendered in this manner will be described in detail with reference to FIGS. 9 to 24.

In accordance with the details of an operation accepted by the operation accepting unit 210, the control unit 270 outputs a corresponding control signal to the image classification unit 250 or the rendering unit 260. In the case where an entered operation accepted by the operation accepting unit 210 is to move the images, the control unit 270 causes the rendering unit 260 to move the images rendered by the rendering unit 260 and to move the map in accordance with the movement of the images. In the case where an entered operation accepted by the operation accepting unit 210 is to select a menu item, the control unit 270 controls the image classification unit 250 to classify the plurality of images stored in the image storage unit 220 into one or more clusters in accordance with the selected menu item. In the case where an entered operation accepted by the operation accepting unit 210 is to select an image, the control unit 270 causes the rendering unit 260 to render the selected image in an area of the map including a position included in attribute information corresponding to the selected image. In the case where an entered operation accepted by the operation accepting unit 210 is to move a cluster containing the selected image, the control unit 270 causes the rendering unit 260 to move images in the cluster and to change the scale of the map in accordance with the movement of the images.

The display unit 280 displays the map and images rendered by the rendering unit 260.

FIG. 3 schematically illustrates images stored in an image storage unit 220. FIG. 4A schematically illustrates a metadata DB 241 storing various types of information for each of the images stored in the image storage unit 220. FIG. 4B schematically illustrates a feature amount DB 242. The metadata DB 241 corresponds to the metadata DB 113 shown in FIG. 1. The feature amount DB 242 corresponds to the feature amount DB 114 shown in FIG. 1. The metadata DB 241 and the feature amount DB 242 correspond to the attribute-information storage unit 240 shown in FIG. 2.

The image storage unit 220 stores images 301 to 312. The images 301 to 312 were captured by, for example, a user 300 living in Tokyo using an image capturing apparatus. It is assumed that the images 301 to 304 are images captured at a barbecue in a mountain near Tokyo; the images 305 to 309 are images captured during a Kyoto trip; and the images 310 to 312 are images captured during a fire drill at XX Corporation in Tokyo. That is, it is assumed that the images 301 to 304 are images captured in the mountain near Tokyo where the barbecue has been held; the image 305 is an image captured at a station near XX Corporation at departure for the Kyoto trip; the images 306 to 309 are images captured in Kyoto during the Kyoto trip; and the images 310 to 312 are images captured near XX Corporation during the fire drill. Furthermore, it is assumed that the images 310 to 312 are images captured substantially at the same position near XX Corporation; the station at which the image 305 was captured exists within a 2-km radius of XX Corporation; the mountain near Tokyo where the images 301 to 304 were captured exists within a radius of 10 to 40 km from XX Corporation; and Kyoto, where the images 306 to 309 were captured, is at a distance of 40 km from XX Corporation.

The metadata DB 241 stores metadata for each of the images stored in the image storage unit 220. For example, the metadata DB 241 is a database that stores pieces of metadata including an image-capturing date, image-capturing place, thumbnail, file path, event, color, and number of persons.

An image-capturing date is information indicating the time and date when a corresponding image was captured. For example, if the corresponding image was captured using an image capturing apparatus, the image-capturing date is recorded by the image capturing apparatus. Although the image-capturing date is stored as, for example, "1/25/2007 13:00" in the metadata DB 241, the image-capturing date is shown in the abbreviated form "1/25 13:00" in FIG. 4A.

An image-capturing place is position information indicating a place where a corresponding image was captured. For example, if the corresponding image was captured using an image capturing apparatus, the position information is recorded by the image capturing apparatus. Regarding the position information, position information obtained using a global positioning system (GPS) device included in the image capturing apparatus is used. Although the image-capturing place is stored as, for example, "longitude XX:XX, latitude YY:YY" in the metadata DB 241, the image-capturing place is omitted in FIG. 4A.

A thumbnail is a size-reduced image of a corresponding image. The thumbnail is generated on the basis of, for example, the corresponding image and is stored in the metadata DB 241. The thumbnail description is omitted in FIG. 4A.

A file path is a file path indicating the storage position of a corresponding image. On the basis of the file path, the image is extracted from the image storage unit 220.

An event is information indicating the details of an occasion on which a corresponding image was captured. For example, "barbecue" (abbreviated as "BBQ" in FIG. 4A) is stored with the images 301 to 304; "Kyoto trip" is stored with the images 305 to 309; and "fire drill" is stored with the images 310 to 312. The user 300 may manually record an event. Alternatively, an event may be automatically recorded on the basis of the image-capturing place and the image-capturing date. When automatically recording an event on the basis of the image-capturing place and the image-capturing date, for example, images captured on the same date and at places within a predetermined area can be recorded as images captured at the same event.

A color is information indicating the color of a corresponding image. For example, the corresponding image can be classified into one of seven colors including black, white, red, blue, green, yellow, and multi-colors, and a corresponding piece of color information is stored. For example, in the case where the corresponding image contains many natural landscapes such as mountains or the like, the overall image seems greenish. Thus, "green" is stored. In the case where a large area of the corresponding image is sea, the overall image seems bluish. Thus, "blue" is stored. These pieces of color information can be obtained from the images stored in the image storage unit 220 using, for example, a histogram analysis or the like. Descriptions of these colors are omitted in FIG. 4A.

The number of persons is information indicating the number of persons included in a corresponding image. In the case where the corresponding image includes only one person by way of example, "portrait" is stored. In the case where the corresponding image includes a plurality of persons, "group photograph" is stored. In the case where the corresponding image includes no persons, "landscape and others" is stored. The border between "portrait" and "group photograph" is, for example, approximately three and four persons. Instead of classifying images including persons into "portrait" and "group photograph", the images can be classified into more detailed groups including "one person", "two persons", "three and four persons", "five to ten persons", "eleven and more persons", and the like. These pieces of information can be obtained on the basis of a detection result obtained using, for example, a face detection method or the like.

The feature amount DB 242 stores a feature amount for each of the images stored in the image storage unit 220. The feature amount can be obtained from each of the images stored in the image storage unit 220 using, for example, a histogram analysis or a frequency analysis. The feature amount obtained is stored as a numeral. On the basis of a corresponding one of feature amounts, whether a reference image is similar to each of the other images is determined. The description of feature amounts is omitted in FIG. 4B.

On the basis of various types of information stored in the metadata DB 241 or the feature amount DB 242, the information processing apparatus 200 classifies the images stored in the image storage unit 220 into one or more clusters and arranges and renders on a map the images contained in each of the clusters. The classification will be described in detail using FIGS. 5A to 7C.

Figure 5A:
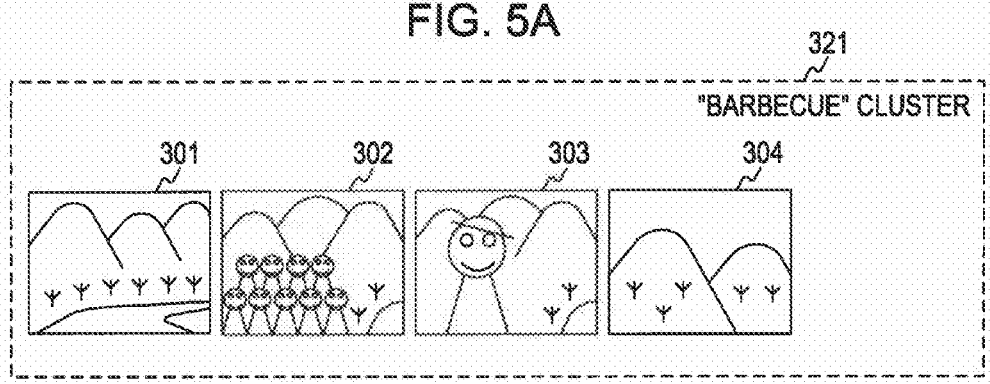
FIGS. 5A to 5C schematically illustrate clusters in the case where the images are classified by "event"
Figure 5B:
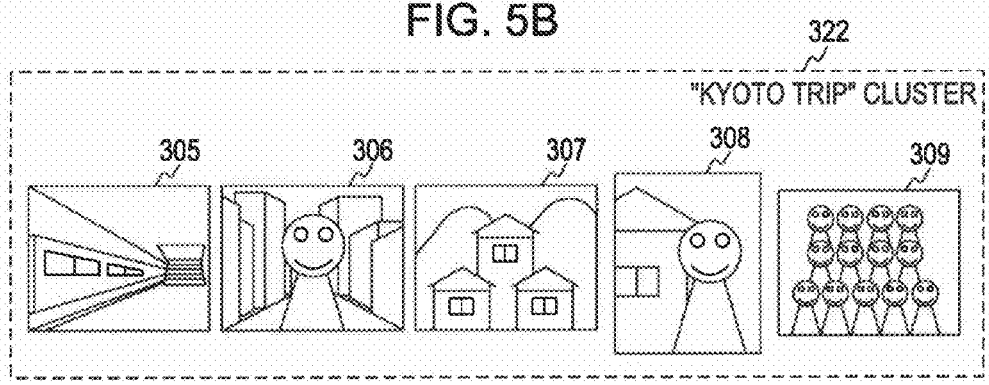
Figure 5C:
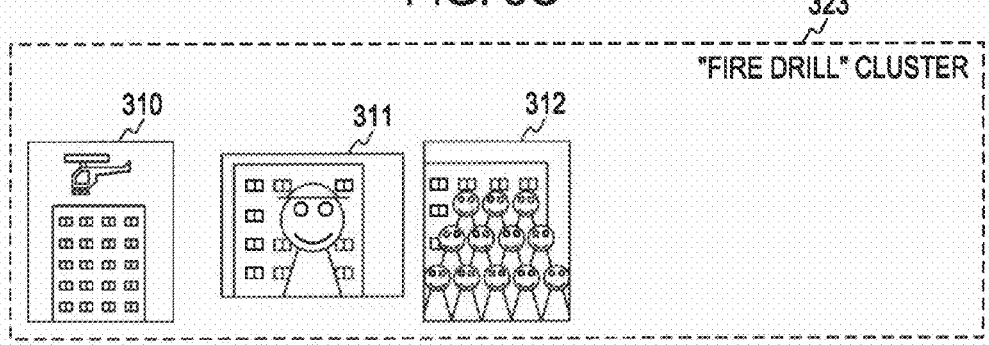
Figure 6A:
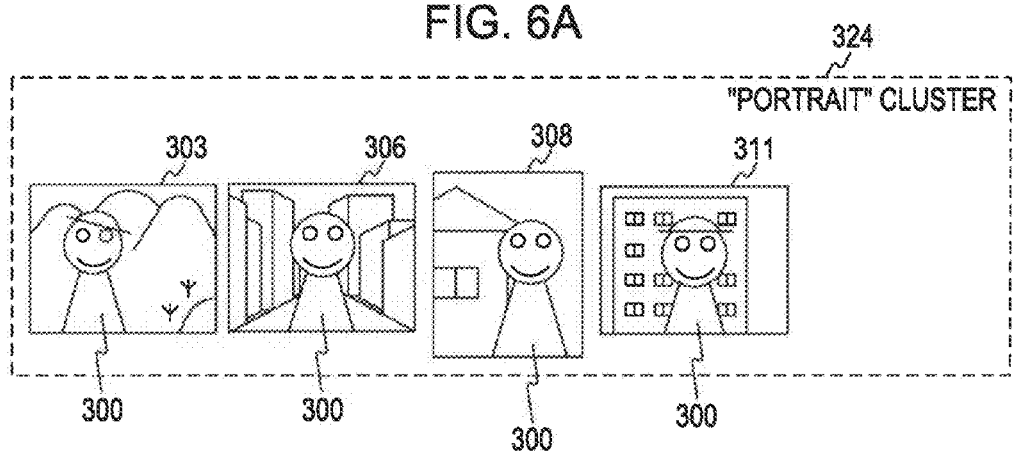
FIGS. 6A to 6C schematically illustrate clusters in the case where the images are classified by "number of persons"
Figure 6B:
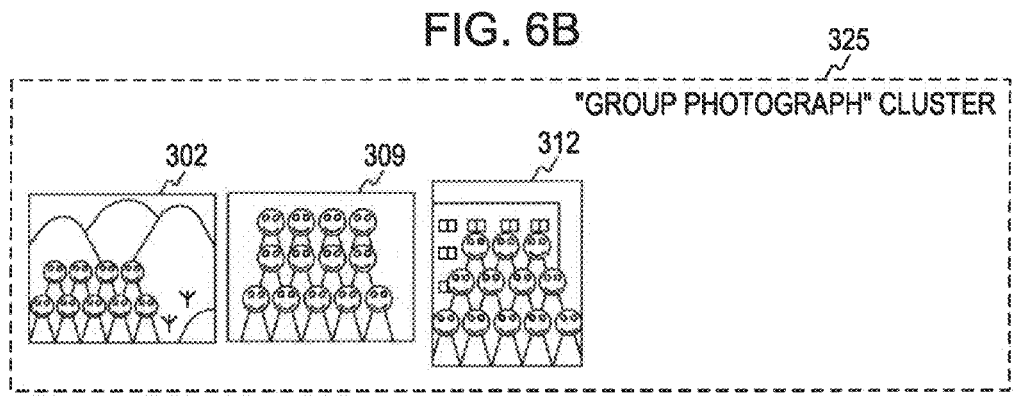
Figure 6C:
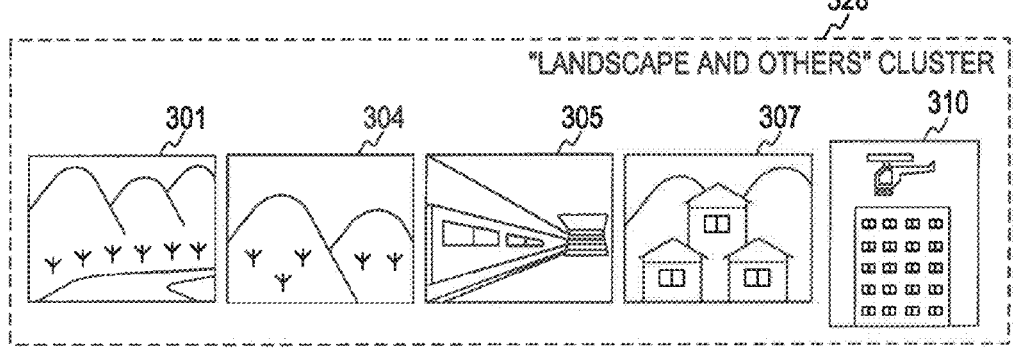
Figure 7A:
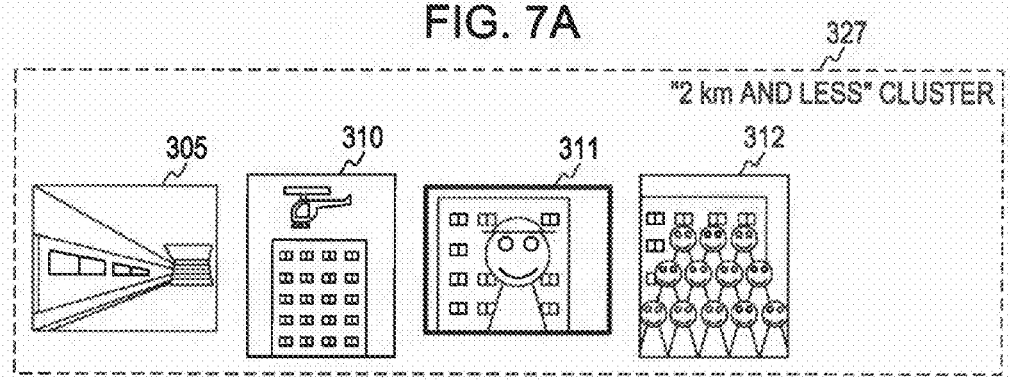
FIGS. 7A to 7C schematically illustrate clusters in the case where the images are classified by "image-capturing place"
Figure 7B:
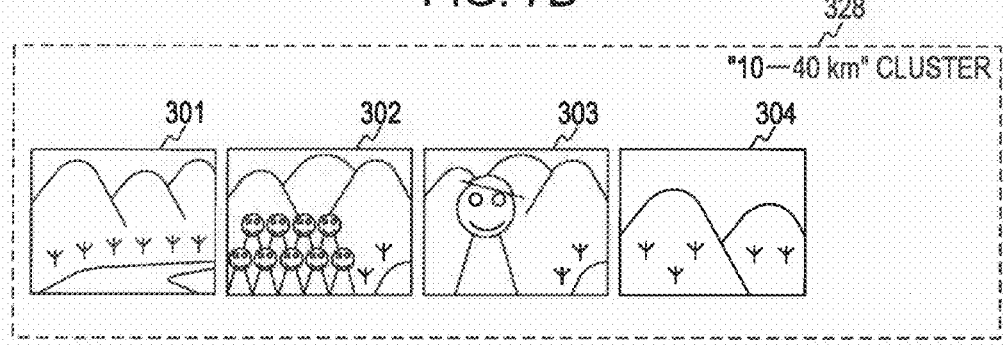
Figure 7C:
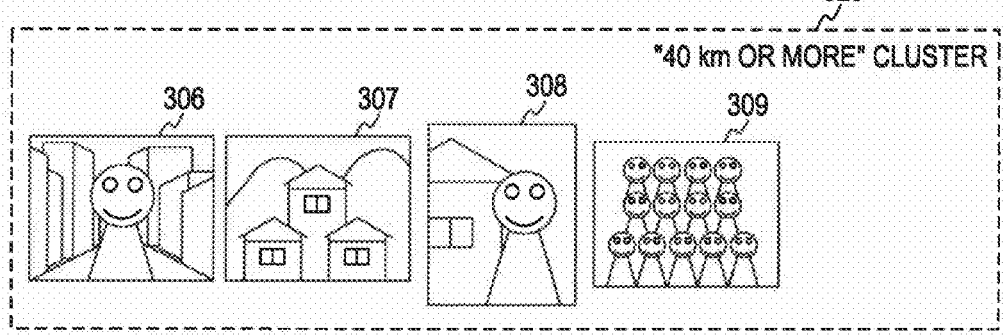

FIGS. 5A to 5C schematically illustrate clusters in the case where the images stored in the image storage unit 220 are classified on the basis of information stored under the attribute "event" in the metadata DB 241. FIGS. 6A to 6C schematically illustrate clusters in the case where the images stored in the image storage unit 220 are classified on the basis of information stored under the attribute "number of persons" in the metadata DB 241. FIGS. 7A to 7C schematically illustrate clusters in the case where the images stored in the image storage unit 220 are classified on the basis of information stored under the attribute "image-capturing place", in the metadata DB 241.

As shown in FIG. 4A, "barbecue", "Kyoto trip", and "fire drill" indicating events are stored under the attribute "event" in association with the images 301 to 312 in the metadata DB 241. In this case, as shown in FIGS. 5A to 5C, the images 301 to 312 stored in the image storage unit 220 are classified into a "barbecue" cluster 321, a "Kyoto trip" cluster 322, and a "fire drill" cluster 323 on the basis of the details of "event" stored in the metadata DB 241. When the clusters 321 to 323 are rendered, the images in the clusters 321 to 323 are rendered in order of, for example, "image-capturing date" stored in the metadata DB 241. In this manner, classification of images on an event-by-event basis allows the user 300 to view a group of images captured at each event.

As shown in FIG. 4A, "one" and "many" indicating the number of persons included in each image and "landscape" are stored under the attribute "number of persons" in association with the images 301 to 312 in the metadata DB 241. In this case, as shown in FIGS. 6A to 6C, the images 301 to 312 stored in the image storage unit 220 are classified into a "portrait" cluster 324, a "group photograph" cluster 325, and a "landscape and others" cluster 326 on the basis of the details of "number of persons" stored in the metadata DB 241. When the clusters 324 to 326 are rendered, the images in the clusters 324 to 326 are rendered in order of, for example, "image-capturing date" stored in the metadata DB 241. In this manner, classification of images according to the number of persons included in the images allows the user 300 to view, for example, a group of images of the user 300 alone.

As shown in FIG. 4A, the longitude and latitude of a place where each of the images 301 to 312 was captured is stored under the attribute "image-capturing place" in association with the images 301 to 312 in the metadata DB 241. In this case, for example, the image 311 stored in the image storage unit 220 serves as a reference image. On the basis of a distance from the image 311, as shown in FIGS. 7A to 7C, the images 301 to 312 stored in the image storage unit 220 are classified into a "2 km and less" cluster 327, a "10-40 km" cluster 328, and a "40 km or more" cluster 329. The classification method will be described in detail with reference to FIG. 8. When the clusters 327 to 329 are rendered, the images in the clusters 327 to 329 are rendered in order of, for example, "image-capturing date" stored in the metadata DB 241. Since there are no images for a "2-10 km" cluster, the "2-10 km" cluster is not shown.

FIG. 8 schematically illustrates the classification method of classifying the images 301 to 312 stored in the image storage unit 220 on the basis of information stored under the attribute "image-capturing place" in the metadata DB 241. For example, the case where the images 301 to 312 are classified on the basis of the image 311 serving as a reference image will be described.

When the images 301 to 312 are classified on the basis of the image 311 serving as a reference image, a position on the map corresponding to the longitude and latitude stored under the attribute "image-capturing place" in the metadata DB 241 in association with the image 311 serves as the center. For example, a circle 331 with a radius of 2 km, a circle 332 with a radius of 10 km, and a circle 333 with a radius of 40 km are set around the center. The images 301 to 310 and the image 312 are classified by determining whether a position on the map corresponding to the longitude and latitude stored under the attribute "image-capturing place" in the metadata DB 241 in association with each of the images 301 to 310 and the image 312 exists within the circles 331 to 333.

For example, since the images 310 to 312 were captured at substantially the same position near XX Corporation, positions corresponding to the images 310 to 312 exist within a 2-km radius of the image 311 serving as the center. Although the image 305 was captured at the event "Kyoto trip", since the image 305 was captured at the station near XX corporation at departure for the Kyoto trip and the station exists within a 2-km radius of XX Corporation, the position corresponding to the image 305 exists within a 2-km radius of the image 311 serving as the center. Accordingly, the image 311 serving as the center and the images 305, 310, and 312 located within a 2-km radius of the image 311 are classified into the "2 km and less" cluster 327.

The images 301 to 304 are images captured in the mountain near Tokyo where the barbecue has been held. Since the mountain exists within a radius of 10-40 km of XX Corporation, positions corresponding to the images 301 to 304 exist within a radius of 10-40 km of the image 311 serving as the center. For example, the images 301 to 304 exist in an area 340 shown in FIG. 8. Accordingly, the images 301 to 304 located within a radius of 10-40 km of the image 311 serving as the center are classified into the "10-40 km" cluster 328.

The images 306 to 309 are images captured in Kyoto during the Kyoto trip. Since Kyoto is at a distance of 40 km from XX Corporation, positions corresponding to the images 306 to 309 exist outside a 40-km radius of the image 311 serving as the center. For example, the images 306 to 309 exist in an area 350 shown in FIG. 8. Accordingly, the images 306 to 309 located outside a 40-km radius of the image 311 serving as the center are classified into the "40 km or more" cluster 329.

Among the images 301 to 312, there are no images that are classified into the "2-10 km" cluster. In the foregoing manner, as shown in FIGS. 7A to 7C, the images stored in the information processing apparatus 200 are classified into the corresponding clusters 327 to 329.

The classification method of classifying the images 301 to 312 stored in the image storage unit 220 on the basis of information stored under the attribute "feature amount" in the feature amount DB 242 will be described. For example, the case where the images 301 to 312 are classified on the basis of the image 311 serving as a reference image will be described. In this case, a numeral stored under the attribute "feature amount" in the feature amount DB 242 in association with the image 311 is compared with each of numerals stored under the attribute "feature amount" in the feature amount DB 242 in association with the other images. If the comparison result shows that the difference between the numeral of the "feature amount" corresponding to the image 311 and the numeral of the "feature amount" corresponding to each of the other images is within a predetermined threshold range, this other image is determined to be similar to the image 311. In contrast, if the comparison result shows that the difference between the numeral of the "feature amount" corresponding to the image 311 and the numeral of the "feature amount" corresponding to each of the other images is outside the predetermined threshold range, this other image is determined to be dissimilar to the image 311. In this manner, the "feature amount" of the image 311 is compared with the "feature amount" of each of the other images, and whether each of the other images is similar to the image 311 is determined. Depending on whether each of the other images is similar or dissimilar to the image 311, the images are classified. Among the images stored in the image storage unit 220, images determined to be similar to the reference image are classified into a "similar" cluster, and images determined to be dissimilar to the reference image are classified into a "dissimilar" cluster.

In the metadata DB 241, "black", "white", "red", "blue", "green", "yellow", and "multi-colors" indicating colors of the images 301 to 312 are stored under the attribute "color" in association with the images 301 to 312. In this case, the images 301 to 312 stored in the image storage unit 220 are classified into color clusters on the basis of the details of "color" stored in the metadata DB 241. When these clusters are rendered, the images in the clusters are rendered in order of, for example, "image-capturing date" stored in the metadata DB 241. In this manner, classification of images by color of each image allows the user 300 to view a group of captured images having a similar color.

In the embodiment of the present invention, as has been described above, the type of clusters into which a plurality of images stored in the image storage unit 220 are classified is referred to as a clustering axis. In the embodiment of the present invention, examples in which the clustering axis is one of five types including "event", "color", "number of persons", "place", and "similarity" will be described. Besides these classification attributes, for example, using a facial-expression detecting method or the like, images can be classified into those including a specific person and those not including the specific person. Alternatively, images can be classified into those including many smiles and those including ordinary facial expressions. Alternatively, images can be classified by other attributes.

Display examples of the clusters into which the images 301 to 312 stored in the image storage unit 220 are classified, which have been described as above, will be described in detail using FIGS. 9 to 24.

Figure 9:
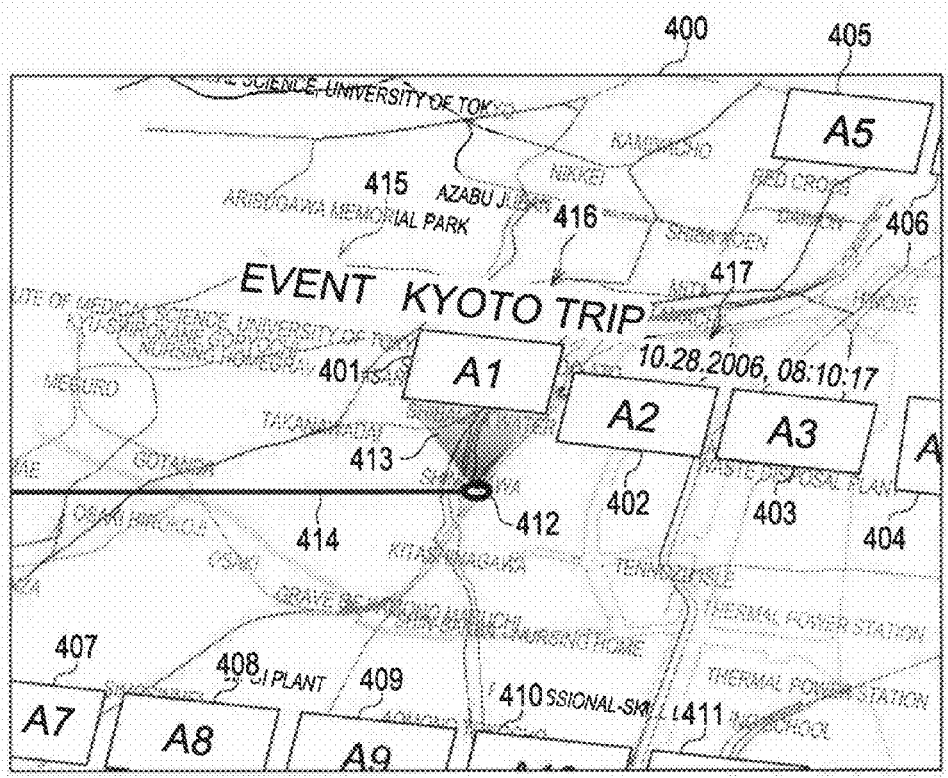
FIG. 9 illustrates a display screen 400 displayed on a display unit 280.

FIG. 9 illustrates a display screen 400, which is an example of a display screen displayed on the display unit 280. In this example, for example, the case where a plurality of images stored in the image storage unit 220 are classified into a "barbecue" cluster, a "Kyoto trip" cluster, a "fire drill" cluster, and the like on the basis of information stored under the attribute "event" in the metadata DB 241 will be described. That is, the case where the clustering axis is "event" will be described. In order to describe the classification, only a few images are contained in each cluster in FIGS. 5A to 7C. Therefore, the number of images contained in each cluster shown in FIGS. 5A to 7C may differ from the number of images contained in each cluster in FIGS. 9 to 24. In FIGS. 9 to 24, portions displaying images are simplified using numerals and characters.

In the embodiment of the present invention, the case where images rendered in the image layer and a map rendered in the map layer are superimposed and displayed will be described. The image layer and the map layer are layers in which the rendering unit 260 renders images and a map. The image layer is a layer in which, among the plurality of images stored in the image storage unit 220, images contained in predetermined clusters are rendered. The map layer is a layer in which a map corresponding to map information stored in the map-information storage unit 230 is rendered.

In the image layer, images contained in each cluster are rendered in a row. A cluster placed in a central portion of the image layer is rendered slightly diagonally in order to increase a display area of the map rendered in the map layer. A cluster above this central cluster is rendered in parallel to the central cluster in the upper right corner of the display screen. A cluster below the central cluster is rendered in parallel to the central cluster in the lower left corner of the display screen. If the clusters are rendered in parallel in this state, images contained in the upper and lower clusters may be rendered outside the screen depending on the details of the upper and lower clusters. Thus, the center position of the images contained in the upper and lower clusters is shifted horizontally and the images are rendered. It is assumed that an image at the center of the display screen is in focus. That is, it is assumed that an image existing in the center of the display screen is a currently selected image.

For example, images 405 and 406 contained in the "barbecue" cluster, images 401 to 404 contained in the "Kyoto trip" cluster, the images 407 to 411 contained in the "fire drill" cluster, and a map centered at a position corresponding to the image 401 are rendered on the display screen 400. On the map on the display screen 400, a menu item 415 and a cluster name 416 of the cluster displayed in the central portion of the display screen 400 are rendered. For example, "event" is rendered as the menu item 415, and "Kyoto trip" is rendered as the cluster name 416. The menu item corresponds to the clustering axis.

In the cluster displayed in the central portion of the display screen 400, the image 401 rendered in the central portion is rendered so that the image 401 can be distinguished from the other images. For example, the periphery of the image 401 is colored dark black.

On the basis of the longitude and latitude stored under the attribute "image-capturing place" in the metadata DB 241 in association with each of the images 401 to 404 in the cluster containing the image 401 in the central portion, a spot (marker indicating an image-capturing place) is rendered at a corresponding position on the map, and the spot and the image are connected with an image showing a shadow. For example, the display screen 400 is in a state where the image 401 is selected. A spot 412 is rendered at a position on the map corresponding to the image 401, and a shadow image 413 connecting the image 401 and the spot 412 is rendered. Accordingly, a selected image and its image-capturing place are connected with a shadow, thereby making the correspondence between the selected image and the image-capturing place more recognizable. If a plurality of spots exist at the same position on the map, the spots in that portion are displayed using brighter colors, thereby making the fact that a plurality of images were captured at that place more recognizable. By making the color of a spot corresponding to a selected image different from the colors of the other spots, the image-capturing position corresponding to the selected image can be made more recognizable.

In the case where "event" is rendered as the menu item 415, spots corresponding to images in the image row (cluster) containing the selected image are connected by lines in order of "image-capturing date" stored in the metadata DB 241. For example, the spot 412 corresponding to the image 401 and a spot corresponding to the image 402 are connected by a line 414. In the case where a line connecting spots corresponding to images is rendered, if places where the images were captured are continuous and close to each other, these places can be grouped into one place and rendered. Accordingly, the rendering of the line can be omitted. Furthermore, the image-capturing time and date are rendered on the right side of a selected image on the basis of the image-capturing time and date stored under the attribute "image-capturing date" in the metadata DB 241 in association with the selected image. For example, "10.28.2006, 08:10:17" is rendered as an image-capturing date 417 on the right side of the selected image 401.

In accordance with the details of an operation accepted by the operation accepting unit 210, images rendered in the central portion of the display screen 400 are moved. For example, images contained in a cluster rendered in the central portion of the display screen 400 are moved left or right by pressing the left or right key. If the left key is pressed while the image at the beginning of the images contained in the cluster rendered in the central portion is selected, or if the right key is pressed while the image at the end is selected, the images are not moved. Note that, in such a case, if the left key is pressed while the image at the beginning is selected, the image at the end may be rendered in the central portion. If the right key is pressed while the image at the end is selected, the image at the beginning may be rendered in the central portion. Alternatively, if the left key is pressed while the image at the beginning is selected, the image at the end of images contained in a cluster rendered in the upper portion may be rendered in the central portion. If the right key is pressed while the image at the end is selected, the image at the beginning of images contained in a cluster rendered in the lower portion may be rendered in the central portion.

More specifically, if the right key is pressed in a state where the display screen 400 shown in FIG. 9 is displayed, the images in the cluster containing the image 401 are moved to the left, and the image 402 is rendered in the central portion of the display screen 400.

For example, images contained in a cluster rendered in the central portion of the display screen 400 are moved up or down by pressing the up or down key, and images in a cluster rendered in the upper or lower portion can be moved up or down to the central portion. If the up key is pressed while the cluster rendered in the central portion is the top cluster, or if the down key is pressed while the cluster rendered in the central portion is the bottom cluster, the images are not moved. Note that, in such a case, if the up key is pressed while the cluster rendered in the central portion is the top cluster, the bottom cluster may be rendered in the central portion. If the down key is pressed while the cluster rendered in the central portion is the bottom cluster, the top cluster may be rendered in the central portion.

More specifically, if the up key is pressed in a state where the display screen 400 shown in FIG. 9 is displayed, the images in the cluster containing the image 401 are moved down, and images in the cluster containing the image 405 are rendered in the central portion of the display screen 400. Accordingly, in the case where the images are moved, the map and spots are rendered so as to correspond to, after the movement, the images rendered in the central portion of the display screen 400.

Next, the cases where clusters for the other clustering axes are rendered will be described with reference to FIGS. 10 to 14.

Figure 10:
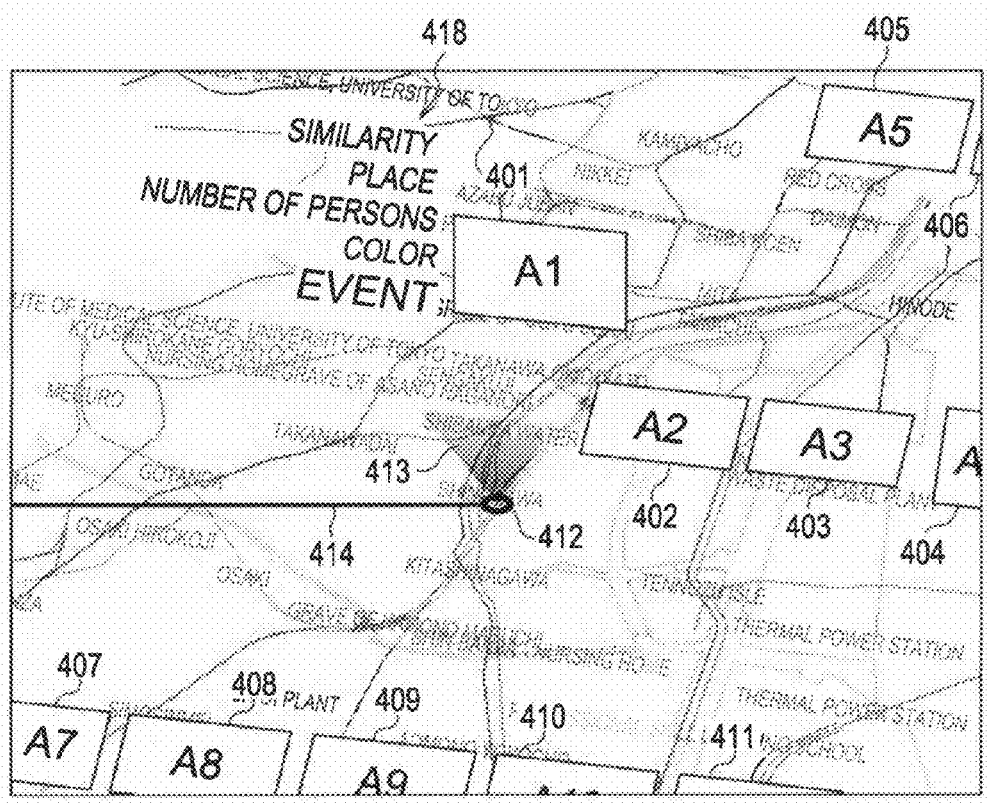
FIG. 10 illustrates a display example in the case where a menu key is pressed while the display screen 400 is displayed.
Figure 11:
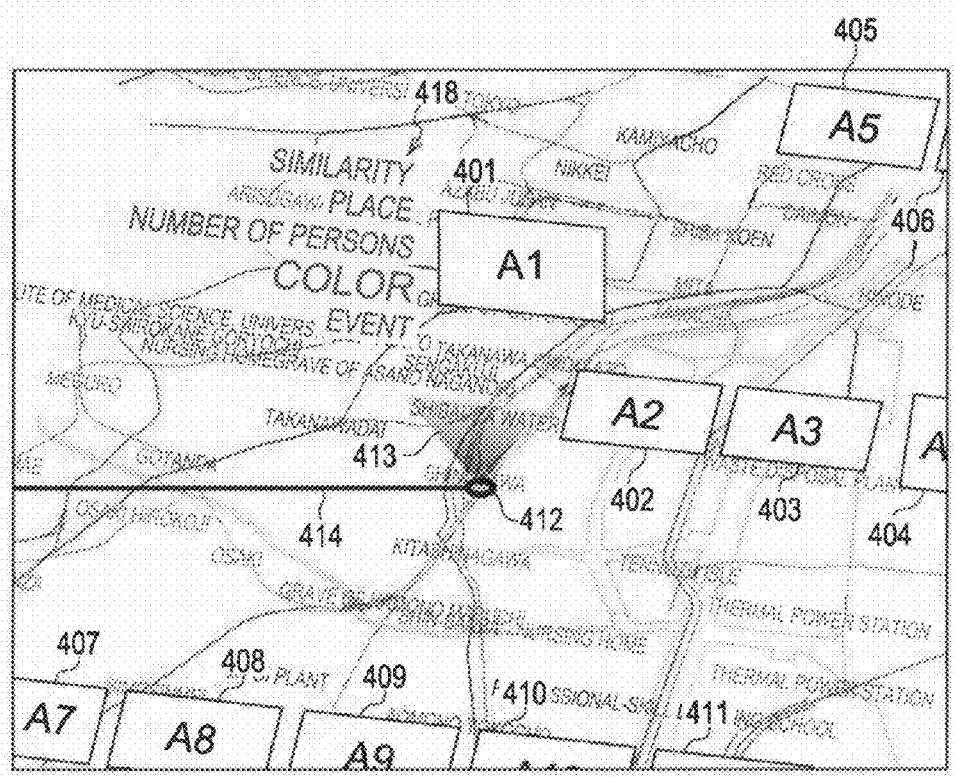
FIG. 11 illustrates a display example in the case where the menu key is pressed while the display screen 400 is displayed.
Figure 12:
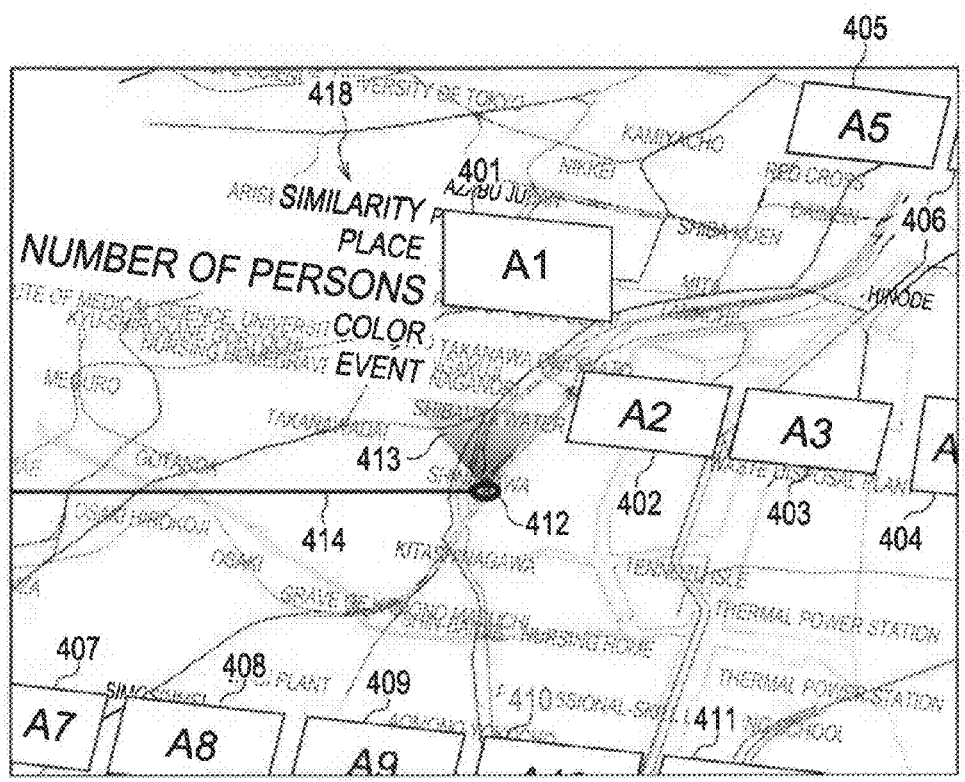
FIG. 12 illustrates a display example in the case where the menu key is pressed while the display screen 400 is displayed.
Figure 13:
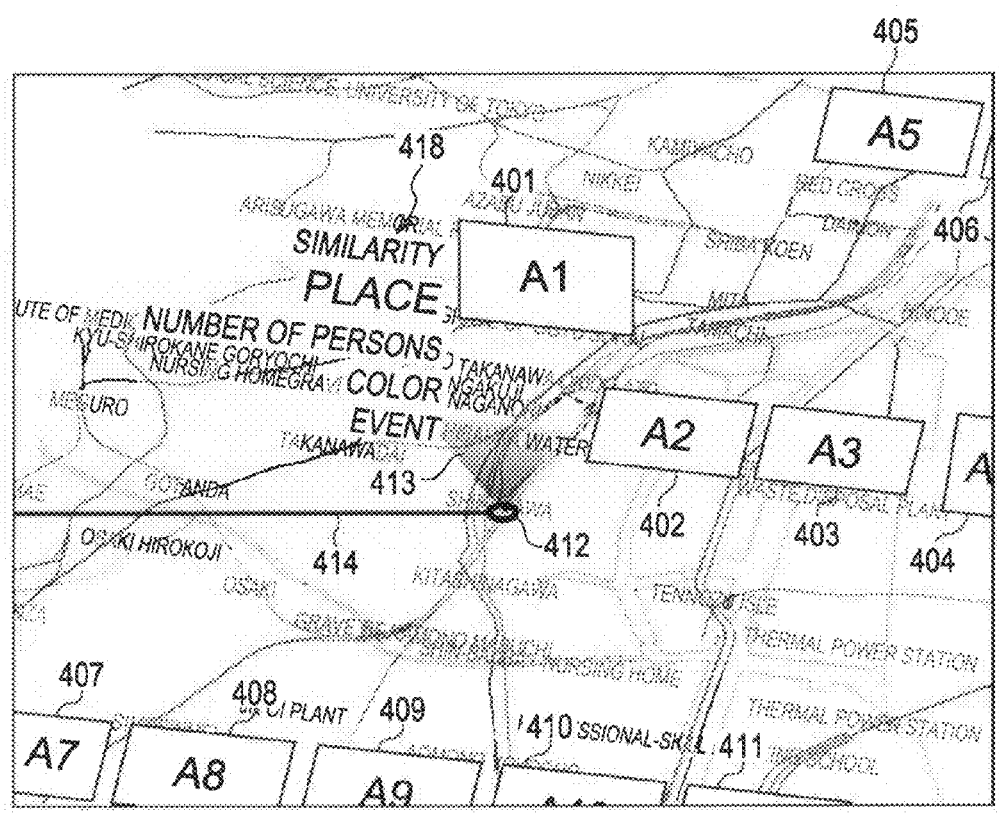
FIG. 13 illustrates a display example in the case where the menu key is pressed while the display screen 400 is displayed.
Figure 14:
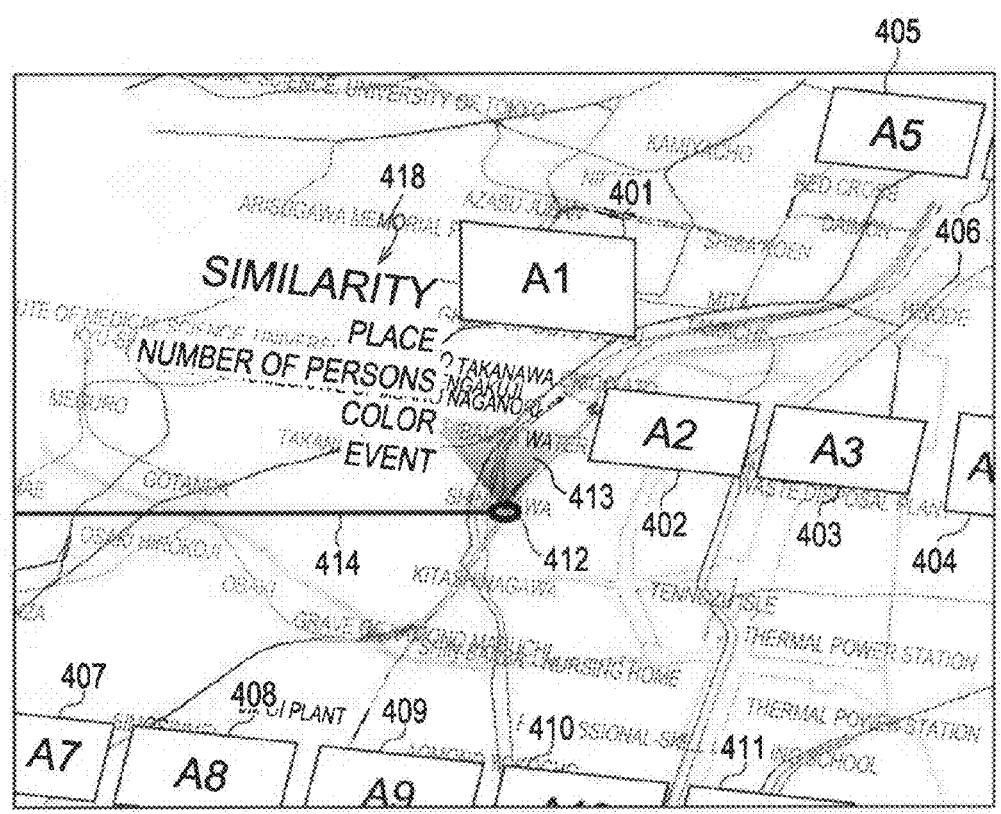
FIG. 14 illustrates a display example in the case where the menu key is pressed while the display screen 400 is displayed.

FIGS. 10 to 14 illustrate display examples of a display screen in the case where the menu key is pressed while the display screen 400 is displayed on the display unit 280. In the case where a predetermined operation is entered when the display screen 400 shown in FIG. 9 is displayed, menu items are displayed on the display unit 280. For example, when the menu key is pressed, as shown in FIGS. 10 to 14, the selected image 401 moves up, and menu items 418 are rendered on the left side of the image 401. Among the menu items 418 rendered, characters of a selected menu item are enlarged and rendered in bold. When the up or down key is pressed in the case where the menu items 418 are rendered, the selected menu item moves up or down in accordance with the pressed key. For example, as shown in FIG. 10, when the up key is pressed in the case where a display screen in which "event" in the menu items 418 is selected is displayed, as shown in FIG. 11, a display screen in which the menu item "color" is selected is displayed. Similarly, when the up key is pressed, the selected menu item moves up, and display screens shown in FIGS. 12 to 14 are sequentially displayed. In contrast, when the down key is pressed, the selected menu item moves down, and display screens shown in FIGS. 10 to 14 are sequentially displayed. By pressing the enter key in a state where characters of a desired menu item are enlarged and rendered in bold, clusters for a clustering axis corresponding to that menu item can be displayed.

In the case where a menu item different from the immediately previous one is selected, a plurality of images stored in the image storage unit 220 are classified into one or more clusters on the basis of the currently selected image serving as a reference image. Even in the case where the same menu item as the immediately previous one is selected, if the immediately previous menu item is "place" or "similarity", the plurality of images stored in the image storage unit 220 are classified into one or more clusters on the basis of the currently selected image serving as a reference image. If the menu key is pressed again without pressing the enter key, the rendered menu items are closed.

Next, display examples in the case where the enter key is pressed in a state where the display screens shown in FIGS. 11 to 14 are displayed will be described in detail using FIGS. 15 to 24.

Figure 15:
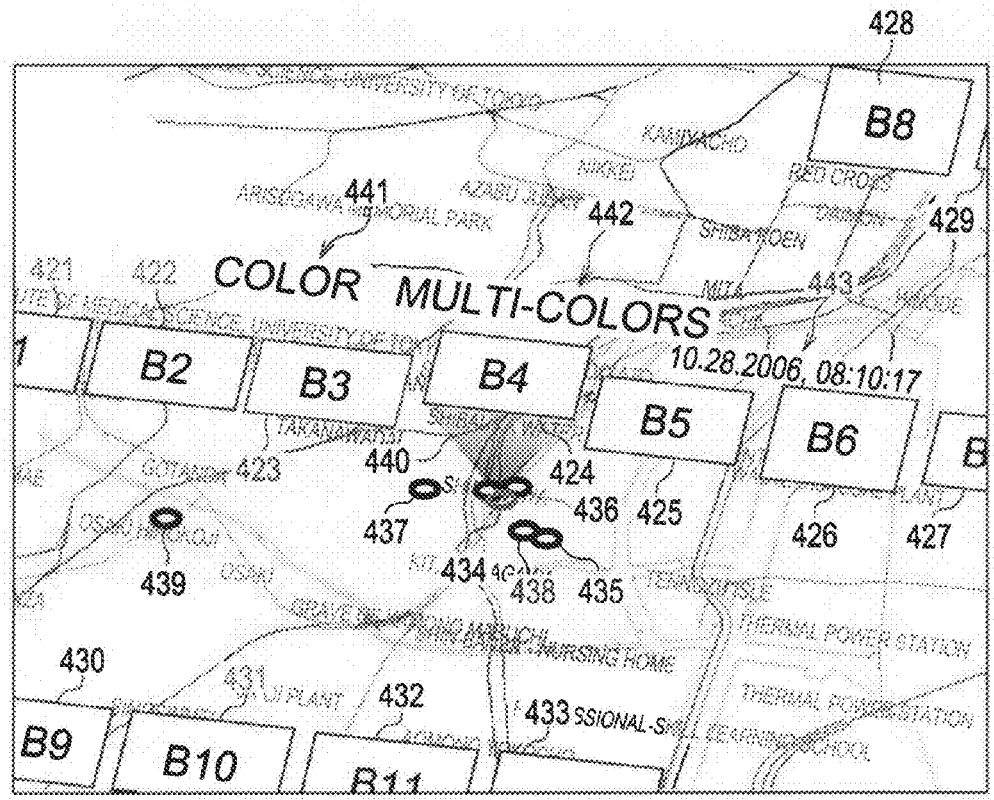
FIG. 15 illustrates a display example in the case where "color" is selected as a menu item.

FIG. 15 illustrates a display example of a display screen in the case where "color" is selected as a menu item. In the case where "color" is selected as a menu item, the images are classified into a plurality of clusters on the basis of information stored under the attribute "color" in the metadata DB 241, and the images contained in each of the clusters are rendered in order of image-capturing date. For example, images 421 to 427 contained in a "multi-colors" cluster are rendered in the central portion, and spots 434 to 439 corresponding to the images 421 to 427 are rendered. Images 428 and 429 contained in a cluster for a different color other than "multi-colors" are rendered in the upper portion, and images 430 to 433 contained in a cluster for a still different color are rendered in the lower portion. For example, "color" is rendered as a menu item 441; "multi-colors" is rendered as a cluster name 442; and "10.28.2006, 08:10:17" is rendered as an image-capturing date 443. Also, a shadow image 440 connecting the image 424 and the spot 434 corresponding to the image 424 is rendered.

Figure 16:
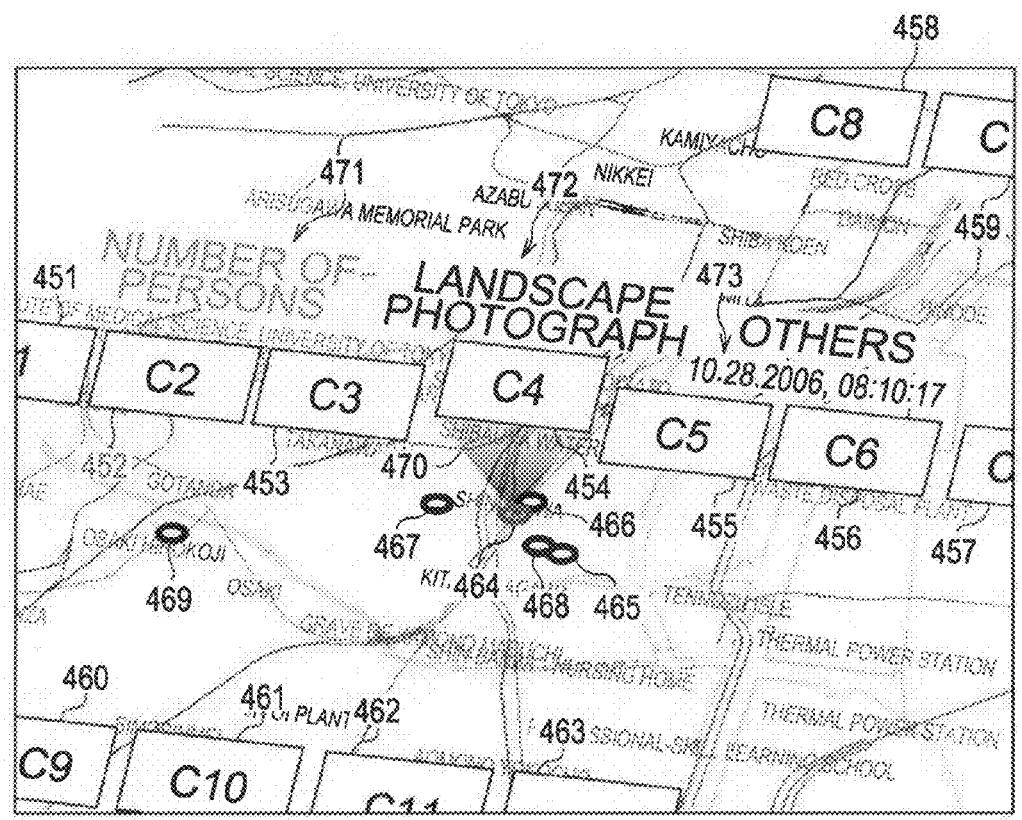
FIG. 16 illustrates a display example in the case where "number of persons" is selected as a menu item.

FIG. 16 illustrates a display example of a display screen in the case where "number of persons" is selected as a menu item. In the case where "number of persons" is selected as a menu item, the images are classified into a plurality of clusters on the basis of information stored under the attribute "number of persons" in the metadata DB 241, and the images contained in each of the clusters are rendered in order of image-capturing date. For example, images 451 to 457 contained in a "landscape and others" cluster are rendered in the central portion, and spots 464 to 469 corresponding to the images 451 to 457 are rendered. Images 458 and 459 contained in a cluster for the number of persons, which is different from the "landscape and others" cluster, are rendered in the upper portion, and images 460 to 463 contained in a cluster for the number of persons, which is different from the above number of persons, are rendered in the lower portion. For example, "number of persons" is rendered as a menu item 471; "landscape and others" is rendered as a cluster name 472; and "10.28.2006, 08:10:17" is rendered as an image-capturing date 473. Also, a shadow image 470 connecting the image 454 and the spot 464 corresponding to the image 454 is rendered.

Figure 17:
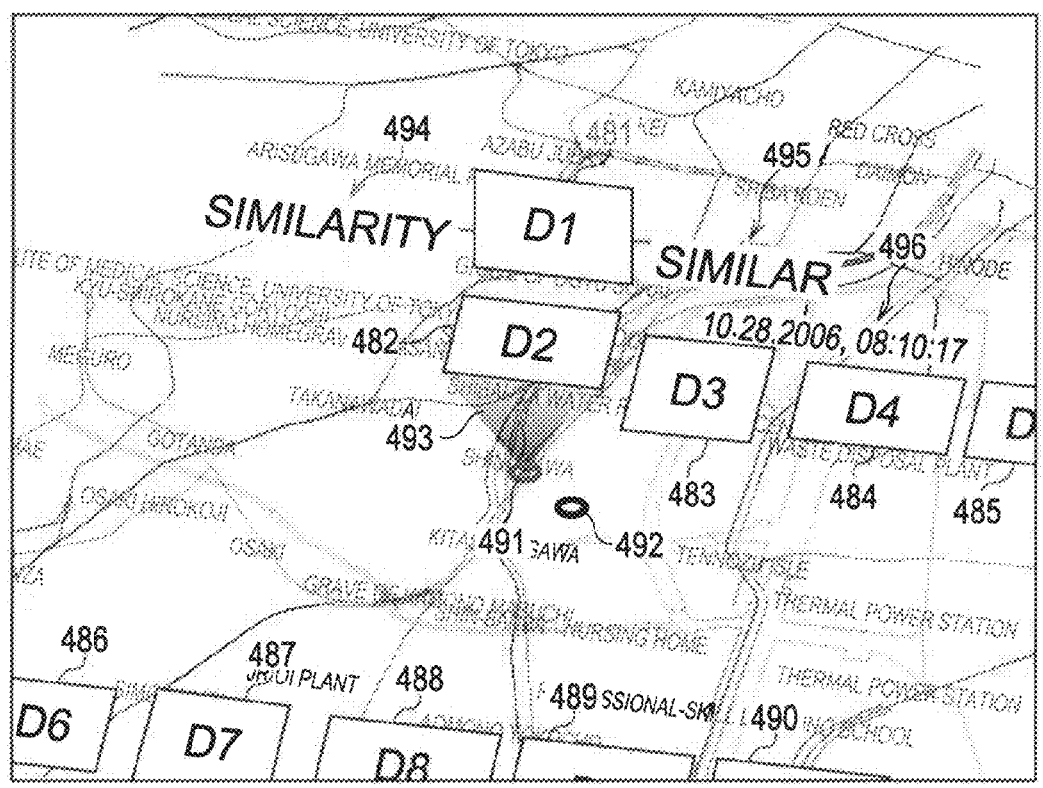
FIG. 17 illustrates a display example in the case where "similarity" is selected as a menu item.

FIG. 17 illustrates a display example of a display screen in the case where "similarity" is selected as a menu item. In the case where "similarity" is selected as a menu item, a selected image serves as a reference image, and whether each of the images other than the reference image is similar to the reference image is determined on the basis of information stored under the attribute "feature amount" in the feature amount DB 242. The images are classified into a cluster containing images similar to the reference image and a cluster containing images dissimilar to the reference image, and the images contained in each of the clusters are rendered in order of image-capturing date. In this case, as shown in FIG. 17, a reference image 481 is placed above the central portion. Accordingly, which one of the images serves as a reference image based on which similar images are extracted can be clearly indicated. For example, for the reference image 481, images 482 to 485 contained in the "similar" cluster are rendered in the central portion, and spots 491 and 492 corresponding to the images 482 to 485 are rendered. Images 486 to 490 contained in the "dissimilar" cluster are rendered in the lower portion. Even in the case where one of the up, down, left, and right keys is pressed, the reference image is rendered at the same position. For example, "similarity" is rendered as a menu item 494; "similar" is rendered as a cluster name 495; and "10.28.2006, 08:10:17" is rendered as an image-capturing date 496. Also, a shadow image 493 connecting the image 482 and the spot 491 corresponding to the image 482 is rendered.

In the case where one of "event", "color", "number of persons", and "similarity" is selected as a menu item, for example, a map with a radius of approximately 2.1 km from an image-capturing place corresponding to a selected image is rendered.

Figure 18:
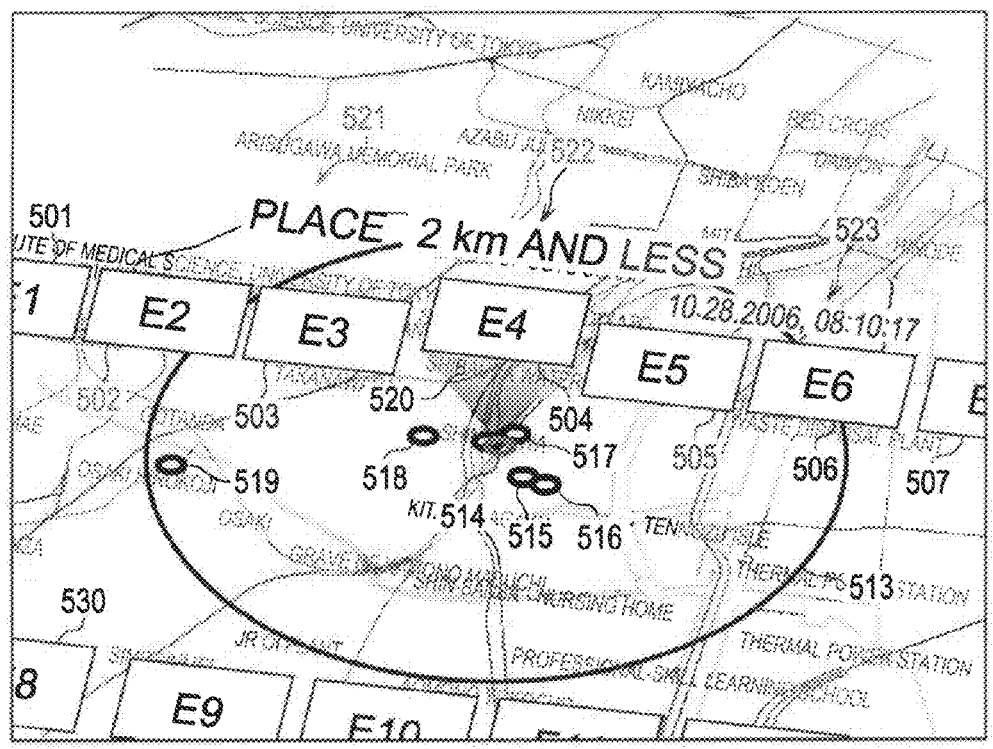
FIG. 18 illustrates a display example in the case where "place" is selected as a menu item.

FIGS. 18 to 21 illustrate display examples of a display screen in the case where "place" is selected as a menu item. In the case where "place" is selected as a menu item, a selected image serves as a reference image, and whether each of the images other than the reference image exists within a predetermined range from the reference image is determined on the basis of information stored under the attribute "image-capturing place" in the feature amount DB 242. For example, as shown in FIG. 8, images existing in a circle with a 2-km radius of the reference image are classified into a "2 km and less" cluster. Images existing in a circle with a radius of 2-10 km from the reference image are classified into a "2-10 km" cluster. Images existing in a circle with a radius of 10-40 km from the reference image are classified into a "10-40 km" cluster. Images existing outside a circle with a 40-km radius of the reference image are classified into a "40 km or more" cluster. The images contained in each of the clusters are rendered in order of the image-capturing date. In this case, for example, as shown in FIG. 18, a reference image 504 is rendered in the central portion, and a circle 513 is rendered so that an image-capturing range around the reference image 504 can be indicated. Also, the position of a spot 514 corresponding to the reference image 504 is fixed as the center position of the map.

Figure 19:
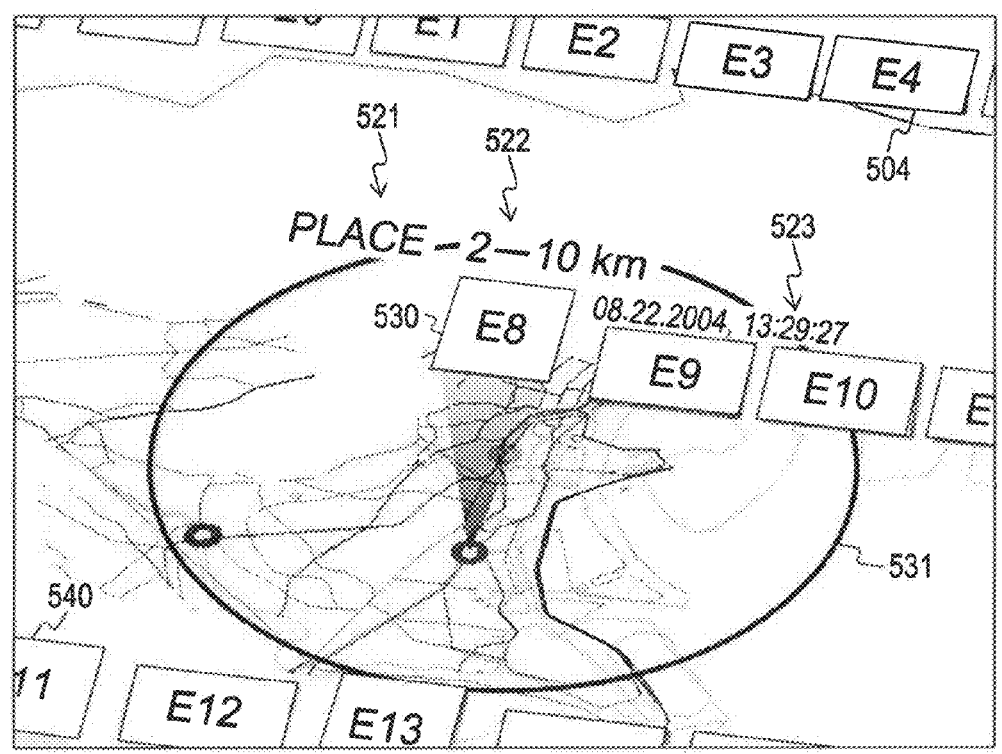
FIG. 19 illustrates a display example in the case where "place" is selected as a menu item.
Figure 20:
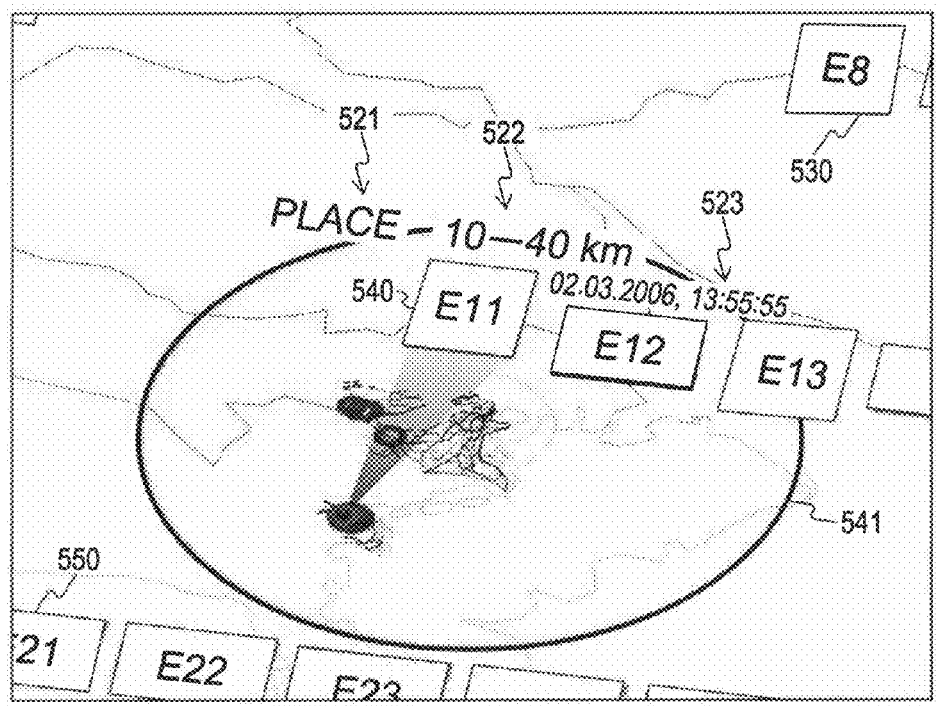
FIG. 20 illustrates a display example in the case where "place" is selected as a menu item.
Figure 21:
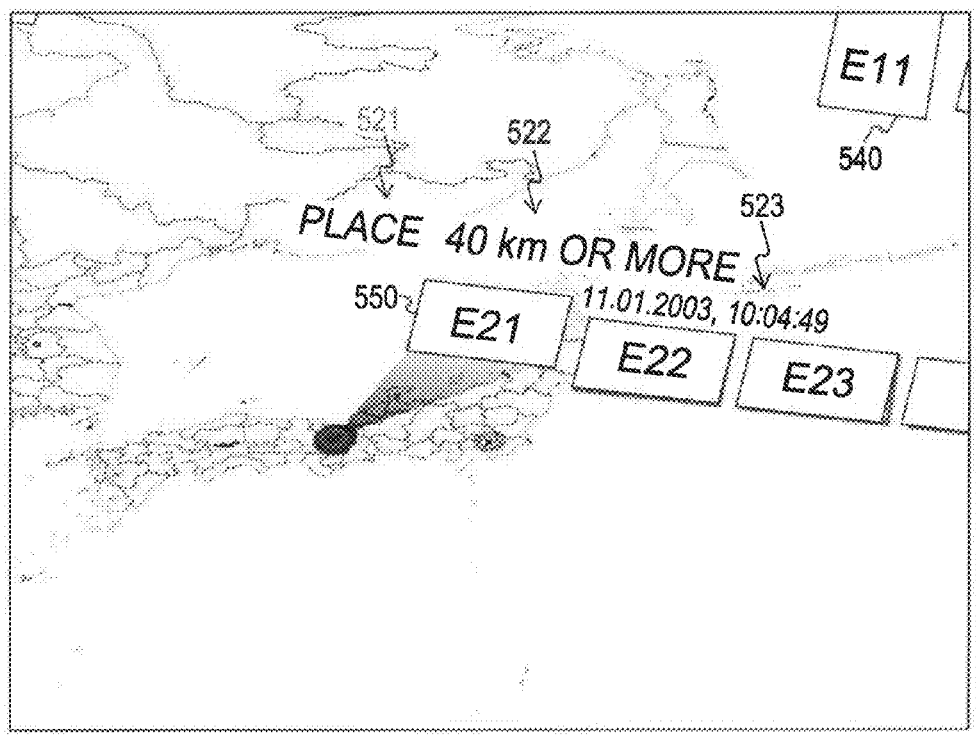
FIG. 21 illustrates a display example in the case where "place" is selected as a menu item.

In the case where one of the up and down keys is pressed, the images contained in each of the clusters are moved up or down, and the scale of the map is changed in accordance with the type of cluster rendered in the central portion. For example, in the case where the "2 km and less" cluster is rendered in the central portion, as shown in FIG. 18, a map is rendered so that the circle 513 with a 2-km radius of the reference image 504 can be rendered, and the selected image 504 is rendered in the central position. For example, in the case where the "2-10 km" cluster is rendered in the central portion, as shown in FIG. 19, a map is rendered so that a circle 531 with a 10-km radius of the position of a spot corresponding to the reference image 504 can be rendered, and a selected image 530 is rendered in the central position. For example, in the case where the "10-40 km" cluster is rendered in the central portion, as shown in FIG. 20, a map is rendered so that a circle 541 with a 40-km radius of the position of a spot corresponding to the reference image 504 (shown in FIG. 18) can be rendered, and a selected image 540 is rendered in the central position. For example, in the case where the "40 km or more" cluster is rendered in the central portion, as shown in FIG. 21, a map is rendered so that a selected image 550 can be placed in the central position and the entirety of Japan can be rendered with the selected image 550 being positioned in the center. In the display screen shown in FIG. 18, for example, "place" is rendered as a menu item 521; "2 km and less" is rendered as a cluster name 522; and "10.28.2006, 08:10:17" is rendered as an image-capturing date 523. Also, a shadow image 520 connecting the image 504 and the spot 514 corresponding to the image 504 is rendered.

Next, the case in which images rendered on a display screen are enlarged or reduced in size and displayed will be described in detail using FIGS. 22 to 24.

Figure 22:
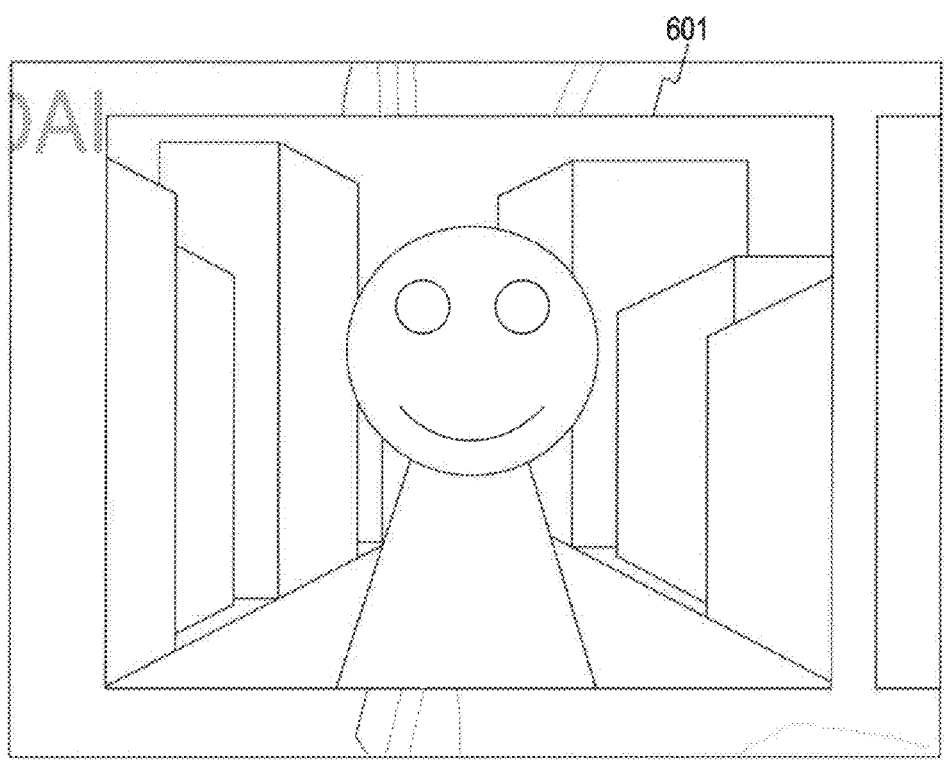
FIG. 22 illustrates a display example in the case where a selected image is enlarged and displayed.
Figure 23:
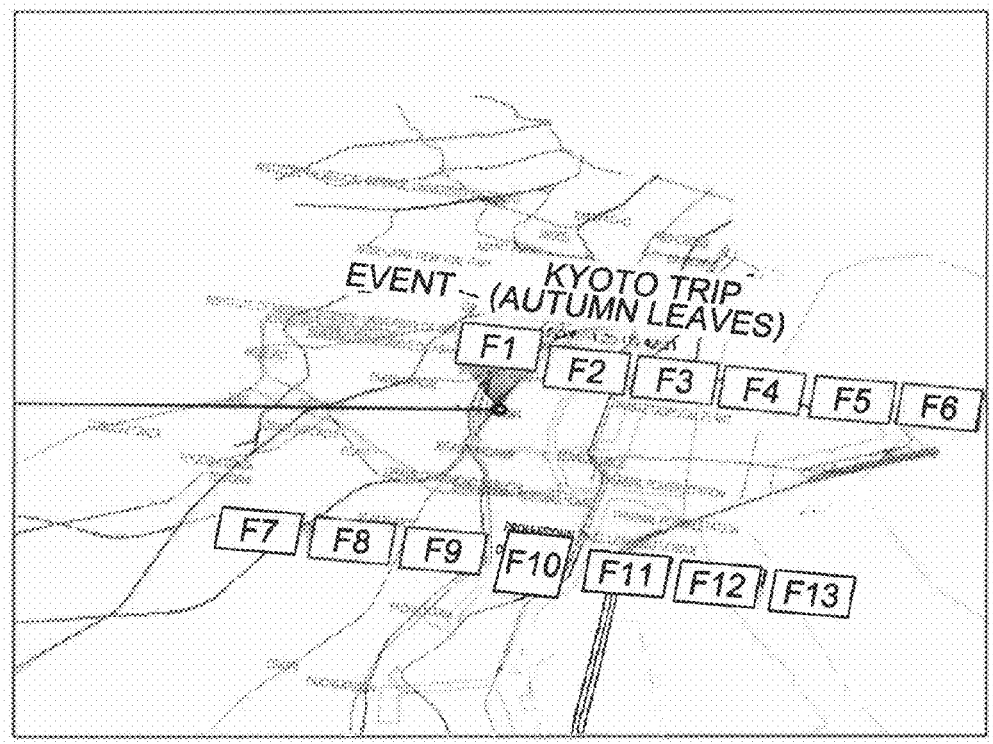
FIG. 23 illustrates a display example in the case where a selected image is reduced in size and displayed.

FIG. 22 illustrates a display example of a display screen in the case where, among images contained in a cluster rendered in the central portion, a selected image is enlarged and displayed. FIG. 23 illustrates a display example of a display screen in the case where, among images contained in a cluster rendered in the central portion, a selected image is reduced in size and displayed. FIG. 24 illustrates a display example of a display screen in the case where the arrangement of images contained in a predetermined cluster is changed.

In the case where a predetermined key is pressed, a selected image displayed on a display screen can be enlarged and displayed. For example, when the zoom-in key is pressed in the case where the display screen 400 shown in FIG. 9 is displayed, the selected image 401 is enlarged, and, for example, as shown in FIG. 22, the enlarged image is displayed as an image 601 on the display screen. In this case, a map corresponding to the image 601 is enlarged and displayed. In the case where the map and images are displayed in such a manner, the images can be moved by pressing the left or right key. Also, the type of clusters can be changed by pressing the up or down key.

In contrast, in the case where a predetermined key is pressed, a selected image displayed on a display screen can be reduced in size and displayed. For example, when the zoom-out key is pressed in the case where the display screen 400 shown in FIG. 9 is displayed, the selected image 401 is reduced in size, and, for example, as shown in FIG. 23, images are displayed on the display screen. In this case, a map corresponding to the selected image is reduced in size and displayed.

Figure 24:
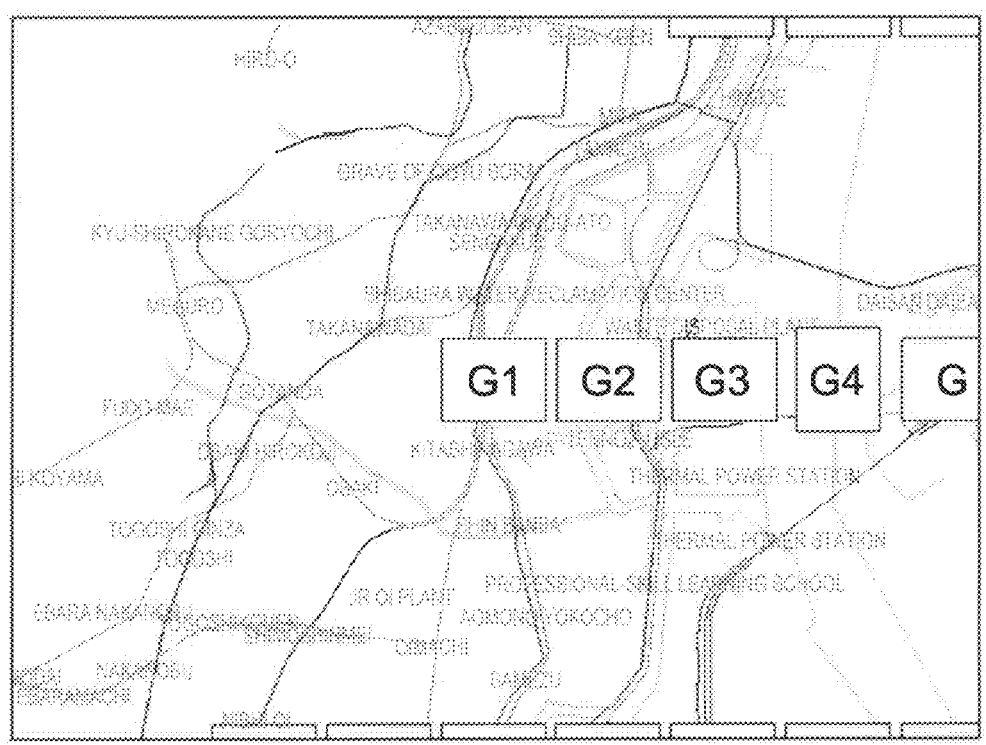
FIG. 24 illustrates a display example in the case where the arrangement of images is changed.

Instead of arranging the images contained in each of the clusters diagonally and rendering the images, as shown in FIG. 24, the images contained in each of the clusters may be arranged horizontally in parallel and rendered. Also, the arrangement of the images can be switched to that shown in FIG. 24 by pressing a predetermined key. By arranging the images in this manner, the vertical direction of the images can be viewed in an image-captured state, and thus, the images become easier to view.

Next, the operation of the information processing apparatus 200 according to the embodiment of the present invention will be described with reference to the drawings.

Figure 25:
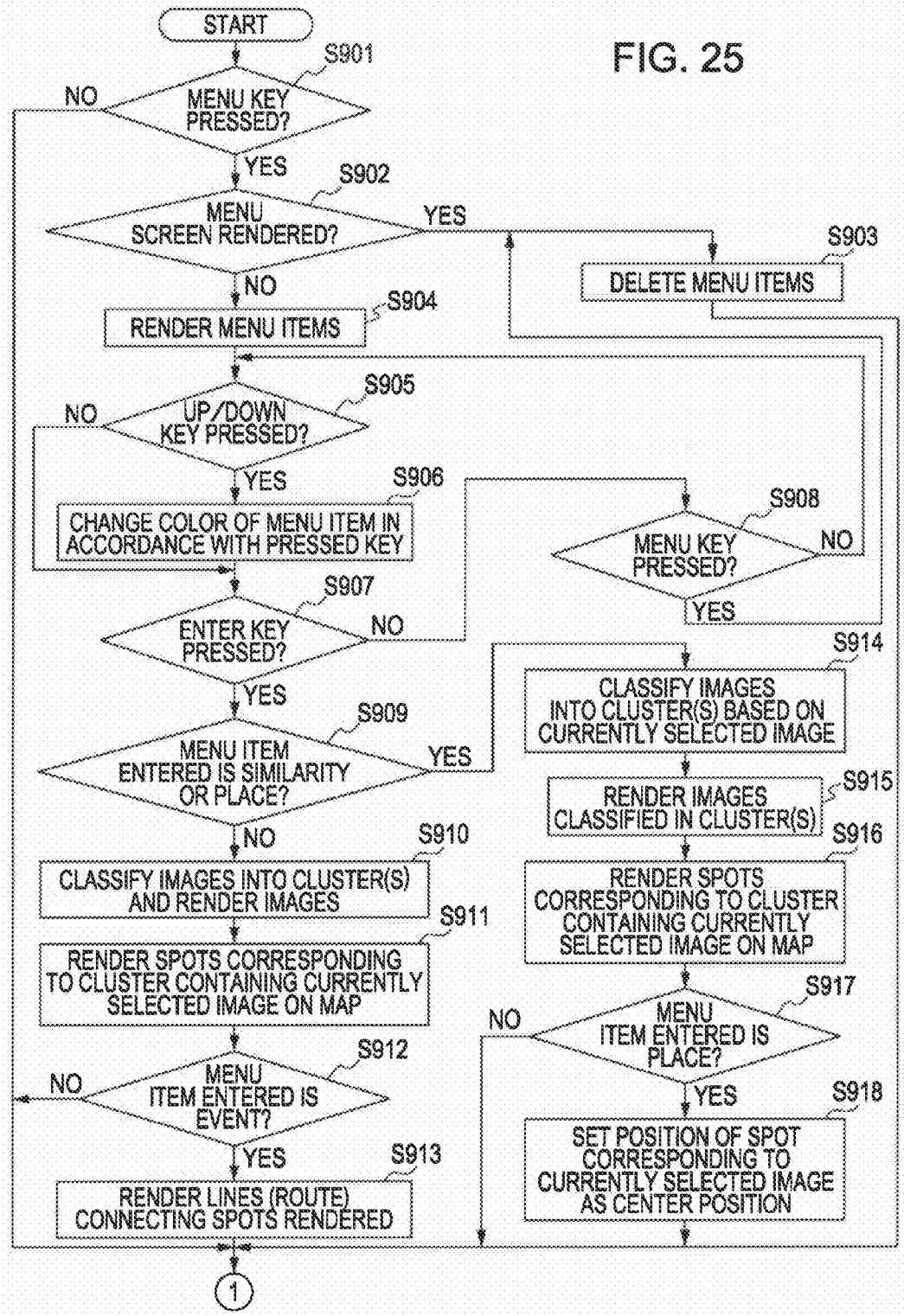
FIG. 25 is a flowchart showing a process of rendering images and a map using the information processing apparatus 200.

FIGS. 25 and 26 are flowcharts showing a process of rendering images and a map using the information processing apparatus 200. It is assumed that images contained in one or more clusters are arranged on a map and rendered on the display unit 280.

At the beginning, whether the menu key has been pressed is determined (step S901). If the menu key has not been pressed (no in step S901), the flow proceeds to step S919. If the menu key has been pressed (yes in step S901), whether a menu screen for selecting a menu item has been rendered is determined (step S902). If the menu screen has been rendered (yes in step S902), the position at which a currently selected image is rendered is changed back to the original position, and menu items rendered next to this image are deleted (step S903). In contrast, if the menu screen has not been rendered (no in step S902), the position at which the currently selected image is rendered is changed, and menu items are rendered next to this image (step S904). For example, as shown in FIGS. 10 to 14, the menu items are rendered. In this case, one of the menu items is rendered as selected.

Whether one of the up and down keys has been pressed is determined (step S905). If one of the up and down keys has been pressed (yes in step S905), the selected menu item is moved up or down in accordance with the pressed key and is rendered (step S906). More specifically, if the up key is pressed, the selected menu item moves up. If the down key is pressed, the selected menu item moves down. If none of the up and down keys have been pressed (no in step S905), the flow proceeds to step S907.

Whether the enter key has been pressed is determined (step S907). If the enter key has not been pressed (no in step S907), whether the menu key has been pressed is determined (step S908). If the menu key has not been pressed (no in step S908), the flow proceeds to step S905, and whether the up and down keys, the enter key, and the menu key have been pressed is monitored (steps S905 to S908). If the menu key has been pressed (yes in step S908), the position at which the currently selected image is rendered is changed back to the original position, and the menu items rendered next to this image are deleted (step S903).

If the enter key has been pressed (yes in step S907), whether the currently selected menu item is "similarity" or "place" is determined (step S909). If the selected menu item is not "similarly" or "place" (no in step S909), the images stored in the image storage unit 220 are classified into one or more clusters on the basis of pieces of information stored in the metadata DB 241 in association with the selected menu item. Among these clusters, images contained in a cluster containing the currently selected image and images contained in clusters above and below this cluster are rendered (step S910).

Spots are rendered at positions on the map corresponding to the images contained in the cluster containing the currently selected image (step S911). Among the spots rendered on the map, a spot corresponding to the currently selected image is rendered in a color different from colors of the other spots so that the spot corresponding to the currently selected image can be distinguishable from the other spots. A shadow image connecting the currently selected image and the spot corresponding to the image is rendered.

Next, whether the menu item selected when the enter key has been pressed in step S907 is "event" is determined (step S912). If the selected menu item is not "event" (no in step S912), the flow proceeds to step S919. If the selected menu item is "event" (yes in step S912), lines (route) connecting the spots rendered on the map are rendered (step S913). These lines are connected in order of, for example, image-capturing date on the basis of the image-capturing date stored in the metadata DB 241.

In the case where the currently selected menu item is "similarity" or "place" in step S909 (yes in step S909), the currently selected image serves as a reference image, and the images stored in the image storage unit 220 are classified into one or more clusters on the basis of pieces of information stored in the metadata DB 241 or the feature amount DB 242 in association with the selected menu item (step S914). Thereafter, among the clusters into which the images have been classified, images contained in a cluster containing the currently selected image and images contained in clusters above and below this cluster are rendered (step S915). If the selected menu item is "similarity", the reference image is rendered above the images contained in the cluster rendered in the center when the menu item "similarity" has been entered. Thereafter, spots are rendered at positions on the map corresponding to the images contained in the cluster containing the currently selected image (step S916).

Next, whether the menu item selected when the enter key has been pressed in step S907 is "place" is determined (step S917). If the selected menu item is not "place" (no in step S917), the flow proceeds to step S919. If the selected menu item is "place" (yes in step S917), the position on the map corresponding to the currently selected image is set and fixed as the center position (step S918). More specifically, a display flag indicating the center position of the map is set. In this manner, if the display flag indicating the center position of the map is set, the map is not moved in accordance with the movement of images contained in a cluster placed in the center. That is, if the type of clusters is "place", the center position of the map is fixed, and the scale of the map is changed on the basis of the center position.

Thereafter, whether the left key or the right key has been pressed is determined (step S919). If none of the left key and the right key have been pressed (no in step S919), the flow proceeds to step S924. If the left key or the right key has been pressed (yes in step S919), the currently selected image is moved to the left or right in accordance with the pressed key (step S920). That is, the selected image is changed to the next image. In this case, the periphery of the selected image is rendered in a color different from colors of the periphery of the other images. Thereafter, whether the type of clusters rendered is "place" is determined (step S921). If the type of clusters rendered is not "place" (no in step S921), the map rendered below the images is moved in accordance with the movement of the images and is rendered (step S922). In this case, the images and the map are rendered so that the selected image and the position on the map corresponding to the selected image can be substantially at the center of the display screen. A shadow image connecting the selected image and the spot corresponding to the selected image is rendered. In contrast, if the type of clusters rendered is "place" (yes in step S921), the map rendered below the images is not moved, and a shadow image connecting the selected image and the spot corresponding to the selected image is rendered (step S923). In this case, the spot corresponding to the selected image and the spot corresponding to the center position are rendered in colors different from those of the other spots so as to be distinguishable from one another.

Thereafter, whether the up key or the down key has been pressed is determined (step S924). If none of the up and down keys have been pressed (no in step S924), the flow proceeds to step S929. If the up key or the down key has been pressed (yes in step S924), a cluster containing the currently selected image is moved up or down in accordance with the pressed key, and a cluster rendered above or below this cluster is placed in the central portion (step S925).

Next, whether the type of clusters rendered is "place" is determined (step S926). If the type of clusters rendered is not "place" (no in step S926), the map rendered below the images is moved in accordance with the movement of the clusters and is rendered, and spots are rendered at positions on the map corresponding to the images contained in the cluster placed in the center (step S927). In this case, the images and the map are rendered so that the selected image and the position on the map corresponding to the selected image can be substantially at the center of the display screen. A shadow image connecting the selected image and the spot corresponding to the selected image is rendered.

In contrast, if the type of clusters rendered is "place" (yes in step S926), the center position of the map rendered below the images is not moved. The scale of the map rendered below the images is changed in accordance with the movement of the clusters, and the map is rendered. Spots are rendered at positions on the map corresponding to the images contained in the cluster placed in the center (step S928). In this case, the images and the map are rendered so that the position of the selected image can be substantially at the center of the display screen. A shadow image connecting the selected image and the spot corresponding to the selected image is rendered. In this case, the spot corresponding to the selected image and the spot corresponding to the center position are rendered in colors different from those of the other spots so as to be distinguishable from one another. For example, in the case where the down key is pressed when the "2 km and less" cluster is rendered in the center, the "2-10 km" cluster is rendered in the center. In this case, a map image rendered in the map layer is zoomed out. In this case, around the position fixed as the center position of the map in step S918, a circle indicating a range containing positions corresponding to images contained in the cluster rendered in the center is rendered. In this manner, the circle indicating the range of the images contained in the cluster rendered in the center is rendered, whereby the image capturing range can become recognizable on the map.

Next, whether the zoom-out key has been pressed is determined (step S929). If the zoom-out key has been pressed (yes in step S929), images currently rendered are reduced in size and rendered (step S930). Next, the map rendered in the map layer is reduced in size in accordance with the size reduction of the images and is rendered (step S931).

If the zoom-out key is not pressed (no in step S929), whether the zoom-in key has been pressed is determined (step S932). If the zoom-in key has been pressed (yes in step S932), images currently rendered are enlarged and rendered (step S933). Next, the scale of the map rendered in the map layer is increased in accordance with the enlargement of the images and the map is rendered (step S934).

As has been described above, according to the embodiment of the present invention, for example, in the case where captured images and a map are simultaneously displayed, a plurality of image-capturing places can be easily searched for on the basis of groups of images. In this case, the individual images and places where the images have been captured can be viewed in an explicit manner. Besides the correspondence between the individual images and the places where the images were captured, a plurality of images can be simultaneously displayed on a cluster-by-cluster basis. In particular, if a plurality of images are organized by event, an event movement history can be displayed on a map. This helps the person who has captured the images to recall the memory and, when the person wants to describe the images to others, the person can give an effective description using the movement history on the map.

Since the clustering axis can be easily changed, the same images can be classified by various attributes. By moving through the images in clusters, image-capturing places in other areas can be traced. Accordingly, unexpected images can be rediscovered.

Since information necessary for browsing images is placed around a focus position and the focus position is fixed to the center of the screen, the point of view moves less, and a load during browsing can be reduced.

Since images and a map are three-dimensionally rendered using an image layer and a map layer, the correspondence between the two layers can be indicated in an explicit manner.

According to the embodiment of the present invention, as has been described above, a group of related images can be rendered on a map corresponding to the images. On the basis of the group of related images rendered on the map, image-capturing places on the map can be easily found.

According to the embodiment of the present invention, the case in which a background image is a map and images indicating pieces of content placed on the background image are captured images has been described. Alternatively, the embodiment of the present invention is applicable to a different background image and different images indicating pieces of content. For example, given an XY coordinate system where the X-axis represents the tempo of music and the Y-axis represents the brightness of music, an image representing the tempo and brightness of a piece of music (an image representing the mood of the piece of music) in accordance with a position in the coordinate system serves as a background image, and audio data serves as content. A photograph based on the piece of music (e.g., a jacket photograph) can be used as an image representing the piece of content. Clusters into which pieces of content can be classified include "singer", "year", "type of music", and the like. Each piece of content is associated with a predetermined position in the XY coordinate system. The background image can be moved in association with a piece of content selected on the display unit.

The embodiment of the present invention can be implemented using, for example, an information processing apparatus, such as a personal computer or the like. The embodiment of the present invention is applicable to televisions, image display apparatuses of cellular phones and the like, and electronic apparatuses capable of rendering images on a map. Alternatively, the information processing apparatus 200 may include an information output unit. The information output unit may output image information corresponding to images rendered using the rendering unit 260, thereby allowing other image display apparatuses or electronic apparatuses to display the same images as those displayed on the display unit 280.

The embodiments of the present invention have been described as examples for embodying the present invention. While the embodiments have correspondence with features of the claims as described below, the present invention is not limited to the foregoing embodiments. It should be understood by those skilled in the art that various modifications, combinations, sub-combinations, and alterations may occur depending on design requirements and other factors insofar as they are within the scope of the appended claims or the equivalents thereof.

That is, an information processing apparatus according to embodiments of the present invention corresponds to, for example, the information processing apparatus 200. An image display apparatus according to an embodiment of the present invention corresponds to, for example, the information processing apparatus 200.

According to an embodiment of the present invention, a content storage unit corresponds to, for example, the image storage unit 220. A background-image storage unit corresponds to, for example, the map-information storage unit 230. An attribute-information storage unit corresponds to, for example, the attribute-information storage unit 240. A classification unit corresponds to, for example, the image classification unit 250. A rendering unit corresponds to, for example, the rendering unit 260.

According to an embodiment of the present invention, an image storage unit corresponds to, for example, the image storage unit 220. A map-information storage unit corresponds to, for example, the map-information storage unit 230. An attribute-information storage unit corresponds to, for example, the attribute-information storage unit 240.

According to embodiments of the present invention, an image classification unit corresponds to, for example, the image classification unit 250.

According to embodiments of the present invention, a rendering unit corresponds to, for example, the rendering unit 260.

According to embodiments of the present invention, an operation accepting unit corresponds to, for example, the operation accepting unit 210. A control unit corresponds to, for example, the control unit 270.

According to an embodiment of the present invention, a display unit corresponds to, for example, the display unit 280.

According to an embodiment of the present invention, an image classification step corresponds to, for example, step S910 or step S914. A rendering step corresponds to, for example, step S910 or step S915.

The steps described in the embodiments of the present invention can be regarded as a method including these steps, or as a program for causing a computer to perform these steps or a recording medium having stored the program thereon.

What is claimed is:

1. An information processing apparatus comprising:
    content storage means for storing a plurality of pieces of content;
    background-image storage means for storing a background image corresponding to the plurality of pieces of content stored in the content storage means;
    attribute-information storage means for storing attribute information for each of the plurality of pieces of content stored in the content storage means in association with the plurality of pieces of content, the attribute information for each of the plurality of pieces of content including a corresponding position in the background image;
    classification means for classifying the plurality of pieces of content into one or more clusters on the basis of the attribute information stored in the attribute-information storage means; and
    rendering means for rendering images indicating the classified pieces of content in a predetermined order on a cluster-by-cluster basis and rendering an area of the background image, the area including the corresponding position included in the attribute information of content corresponding to at least one of the images rendered.

2. An information processing apparatus comprising:
    image storage means for storing a plurality of images;
    map-information storage means for storing map information;
    attribute-information storage means for storing attribute information for each of the plurality of images stored in the image storage means in association with the plurality of images;
    image classification means for classifying the plurality of images stored in the image storage means into one or more clusters on the basis of the attribute information stored in the attribute-information storage means; and
    rendering means for rendering the classified images in a predetermined order on a cluster-by-cluster basis and rendering an area of a map, the area corresponding to at least one of the images rendered.

3. The information processing apparatus according to claim 2, wherein the attribute information includes a position on the map, the position corresponding to the map information stored in the map-information storage means, and wherein the information processing apparatus further includes:
    operation accepting means for accepting an operation entered for selecting at least one of the images rendered by the rendering means; and
    control means for controlling, in a case where the operation entered for selecting the image is accepted by the operation accepting means, the rendering means to place and render the image in an area of the map, the area including a position included in the attribute information corresponding to the image.

4. The information processing apparatus according to claim 3, wherein the rendering means renders a position marker indicating a position on the map, the position being included in the attribute information corresponding to each of images in a cluster containing the selected image.

5. The information processing apparatus according to claim 4, wherein the rendering means connects the selected image and the position marker corresponding to the selected image with a predetermined image.

6. The information processing apparatus according to claim 4, wherein the attribute information includes times and dates at which the plurality of images stored in the image storage means were captured, and
    wherein the rendering means renders predetermined line segments so as to connect position markers corresponding to the images in the cluster containing the selected image in order of time and date included in the attribute information corresponding to the images.

7. The information processing apparatus according to claim 3, wherein the attribute information includes a feature amount for each of the plurality of images stored in the image storage means,
    wherein the image classification means classifies the plurality of images stored in the image storage means into two clusters on the basis of a result of comparison of the feature amount included in the attribute information corresponding to the selected image and feature amounts included in the attribute information corresponding to images other than the selected image, and
    wherein the rendering means places and renders the selected image at a position differing from positions at which the classified images are placed on a cluster-by-cluster basis.

8. The information processing apparatus according to claim 3, wherein the image classification means classifies the plurality of images stored in the image storage means into one or more clusters on the basis of a result of comparison of the position included in the attribute information corresponding to the selected image and positions included in the attribute information corresponding to images other than the selected image, and
    wherein the rendering means renders a circle in accordance with the clusters around the position included in the attribute information corresponding to the selected image.

9. The information processing apparatus according to claim 8, wherein the operation accepting means accepts an operation entered for moving a cluster containing the selected image, and
    wherein, in a case where the operation entered for moving the cluster is accepted by the operation accepting means, the control means controls the rendering means to move images in the cluster containing the selected image, change a scale of the map in accordance with movement of the images, and render the images and the map.

10. The information processing apparatus according to claim 3, wherein the operation accepting means accepts an operation entered for selecting a type of clusters, and wherein, in a case where the operation entered for selecting the type of clusters is accepted by the operation accepting means, the control means controls the image classification means to classify the plurality of images stored in the image storage means by the selected type of clusters on the basis of the selected image serving as a reference image.

11. The information processing apparatus according to claim 3, wherein the rendering means arranges and renders the classified images around the selected image serving as a center position on a cluster-by-cluster basis.

12. The information processing apparatus according to claim 2, further comprising:

operation accepting means for accepting an operation entered for moving the images rendered by the rendering means; and control means for controlling, in a case where the operation entered for moving the images is accepted by the operation accepting means, the rendering means to move and render the images rendered by the rendering means and to move and render the map in accordance with movement of the images.

13. The information processing apparatus according to claim 2, further comprising display means for displaying the images and the area of the map rendered by the rendering means.

14. An image display apparatus comprising:

image storage means for storing a plurality of images;

map-information storage means for storing map information;

attribute-information storage means for storing attribute information for each of the plurality of images stored in the image storage means in association with the plurality of images;

image classification means for classifying the plurality of images stored in the image storage means into one or more clusters on the basis of the attribute information stored in the attribute-information storage means;

rendering means for rendering the classified images in a predetermined order on a cluster-by-cluster basis and rendering an area of a map, the area corresponding to at least one of the images rendered; and display means for displaying the images and the area of the map rendered by the rendering means.

15. A method for controlling an information processing apparatus including image storage means for storing a plurality of images, map-information storage means for storing map information, and attribute-information storage means for storing attribute information for each of the plurality of images stored in the image storage means in association with the plurality of images, the method comprising the steps of:

classifying the plurality of images stored in the image storage means into one or more clusters on the basis of the attribute information stored in the attribute-information storage means; and rendering the classified images in a predetermined order on a cluster-by-cluster basis and rendering an area of a map, the area corresponding to at least one of the images rendered.

16. A non-transitory computer-readable medium storing a computer program for causing a computer to perform a method for controlling an information processing apparatus including image storage means for storing a plurality of images, map-information storage means for storing map information, and attribute-information storage means for storing attribute information for each of the plurality of images stored in the image storage means in association with the plurality of images, the method comprising the steps of:

classifying the plurality of images stored in the image storage means into one or more clusters on the basis of the attribute information stored in the attribute-information storage means; and rendering the classified images in a predetermined order on a cluster-by-cluster basis and rendering an area of a map, the area corresponding to at least one of the images rendered.

17. An information processing apparatus comprising:

a content storage unit configured to store a plurality of pieces of content;

a background-image storage unit configured to store a background image corresponding to the plurality of pieces of content stored in the content storage unit;

an attribute-information storage unit configured to store attribute information for each of the plurality of pieces of content stored in the content storage unit in association with the plurality of pieces of content, the attribute information for each of the plurality of pieces of content including a corresponding position in the background image;

a classification unit configured to classify the plurality of pieces of content into one or more clusters on the basis of the attribute information stored in the attribute-information storage unit; and a rendering unit configured to render images indicating the classified pieces of content in a predetermined order on a cluster-by-cluster basis and to render an area of the background image, the area including the corresponding position included in the attribute information of content corresponding to at least one of the images rendered.

18. An information processing apparatus comprising:

an image storage unit configured to store a plurality of images;

a map-information storage unit configured to store map information;

an attribute-information storage unit configured to store attribute information for each of the plurality of images stored in the image storage unit in association with the plurality of images;

an image classification unit configured to classify the plurality of images stored in the image storage unit into one or more clusters on the basis of the attribute information stored in the attribute-information storage unit; and a rendering unit configured to render the classified images in a predetermined order on a cluster-by-cluster basis and to render an area of a map, the area corresponding to at least one of the images rendered.

19. An image display apparatus comprising:

an image storage unit configured to store a plurality of images;

a map-information storage unit configured to store map information;

an attribute-information storage unit configured to store attribute information for each of the plurality of images stored in the image storage unit in association with the plurality of images;

an image classification unit configured to classify the plurality of images stored in the image storage unit into one or more clusters on the basis of the attribute information stored in the attribute-information storage unit;

a rendering unit configured to render the classified images in a predetermined order on a cluster-by-cluster basis and to render an area of a map, the area corresponding to at least one of the images rendered; and a display unit configured to display the images and the area of the map rendered by the rendering unit.

* * * * *